US010995194B2

(12) United States Patent
Krishnan et al.

(10) Patent No.: US 10,995,194 B2
(45) Date of Patent: May 4, 2021

(54) FILLED ELASTOMERS WITH IMPROVED THERMAL AND MECHANICAL PROPERTIES

(71) Applicant: Hydril USA Distribution LLC, Houston, TX (US)

(72) Inventors: Sitaraman Krishnan, Potsdam, NY (US); Malavarayan Sankarasubramanian, Chandler, AZ (US); John C. Moosbrugger, Potsdam, NY (US); Monavareh Torabizadeh, Potsdam, NY (US); Zackary Putnam, Potsdam, NY (US); Ming Yu Huang, Humble, TX (US); Yuhua Dong, Houston, TX (US)

(73) Assignee: HYDRIL USA DISTRIBUTION LLC, Houston, TX (US)

( * ) Notice: Subject to any disclaimer, the term of this patent is extended or adjusted under 35 U.S.C. 154(b) by 386 days.

(21) Appl. No.: 15/809,690

(22) Filed: Nov. 10, 2017

(65) Prior Publication Data

US 2018/0134863 A1     May 17, 2018

Related U.S. Application Data

(60) Provisional application No. 62/421,494, filed on Nov. 14, 2016.

(51) Int. Cl.
*C08K 3/04* (2006.01)
*C08K 3/34* (2006.01)
*C08K 7/06* (2006.01)

(52) U.S. Cl.
CPC ............... *C08K 3/04* (2013.01); *C08K 3/346* (2013.01); *C08K 7/06* (2013.01)

(58) Field of Classification Search
None
See application file for complete search history.

(56) References Cited

U.S. PATENT DOCUMENTS

| 6,323,273 B1 | 11/2001 | Mahmud et al. |
| 8,283,402 B2 | 10/2012 | Slay et al. |

(Continued)

FOREIGN PATENT DOCUMENTS

| CN | 1041317 A | 4/1990 |
| CN | 104131797 A | 11/2014 |

(Continued)

OTHER PUBLICATIONS

International Preliminary Report on Patentability dated May 23, 2019 in corresponding PCT Application No. PCT/US2017/061428.

(Continued)

*Primary Examiner* — Monica A Huson
(74) *Attorney, Agent, or Firm* — Hogan Lovells US LLP

(57) ABSTRACT

The invention relates to elastomeric compositions containing filler particles that are predominantly two-dimensional in shape. The elastomeric compositions exhibit significantly improved thermal, chemical, and mechanical properties as compared with elastomers containing conventional fillers such as natural clay, carbon black, and carbon fiber. In addition, the elastomeric compositions of the invention exhibit improved resistance to solvent-induced swelling and to unwanted permeation of gases such as hydrogen sulfide. The invention also provides a method of forming such elastomeric compositions and methods of using such elastomeric compositions to prepare elastomeric articles with improved resistance to thermal, chemical, and mechanical stresses.

15 Claims, 23 Drawing Sheets

(56) References Cited

U.S. PATENT DOCUMENTS

| | | |
|---|---|---|
| 8,614,273 B2 | 12/2013 | Noguchi et al. |
| 2005/0065264 A1 | 3/2005 | Pazur |
| 2005/0161212 A1 | 6/2005 | Leismer et al. |
| 2007/0142547 A1 | 6/2007 | Vadiya et al. |
| 2009/0152009 A1 | 6/2009 | Slay et al. |
| 2010/0140516 A1 | 6/2010 | Butuc |
| 2015/0368438 A1 | 12/2015 | Schwartz et al. |
| 2016/0068728 A1 | 3/2016 | Akulichev et al. |

FOREIGN PATENT DOCUMENTS

| | | |
|---|---|---|
| EP | 1 637 556 A1 | 3/2006 |
| EP | 2 615 149 A1 | 7/2013 |
| WO | 2016/080956 | 5/2016 |

OTHER PUBLICATIONS

Elaheh Ghassemieh, "Enhancement of the Properties of EPDM/NBR Elastomers Using Nanoclay for Seal Applications," May 12, 2009, Polymer Composites, pp. 1657-1667.

Y. Liu et al., "Fracture properties of natural rubber filled with hybrid carbon black/nanoclay," Sep. 2011, Journal of Polymer Research, vol. 18, pp. 859-867.

International Search Report and Written Opinion issued in connection with corresponding PCT Application No. PCT/US2017/061428 dated Feb. 22, 2018.

M. Sankarasubramanian, "Enhanced elastomer toughness and fracture properties imparted by chemically reactive flat nanoparticles," 2019, Polymer Testing, vol. 78, 19 pages.

FILLED ELASTOMERS WITH IMPROVED THERMAL AND MECHANICAL PROPERTIES

CROSS-REFERENCE TO RELATED APPLICATION

The present application claims the benefit of priority to U.S. Provisional Application 62/421,494 filed Nov. 14, 2016, which is hereby incorporated by reference in its entirety. All publications, patents, patent applications, databases and other references cited in this application, all related applications referenced herein, and all references cited therein, are incorporated by reference in their entirety as if restated here in full and as if each individual publication, patent, patent application, database or other reference were specifically and individually indicated to be incorporated by reference.

TECHNICAL FIELD

The present invention relates to elastomeric compositions with improved mechanical and physical properties. The elastomeric compositions of the invention find use as seals or gaskets in oil and gas recovery devices and can be used over a wide range of temperatures and a wide range of differential pressures.

BACKGROUND OF THE INVENTION

Elastomer compositions find use in a variety of applications, including as material for seals and gaskets. When elastomeric seals and gaskets are used under ambient conditions or with non-corrosive or non-toxic chemicals, the chemical and physical demands on the type of elastomer are not particularly stringent. However, in aggressive sealing applications, such as those encountered in oil and gas recovery, polymeric compositions that only consist of elastomers have several limitations in their physical properties. For example, such elastomeric compositions may have poor tensile and compressive strengths or may be prone to chemical deterioration or swelling in solvents and gases.

For this reason, elastomeric compositions comprising certain fillers have been developed. The incorporation of filler particles in an elastomer matrix may improve the stiffness of the material, while retaining the essential sealing properties such as sealing force retention under load and elastic recovery. Fillers such as carbon black and silica particles are common. However, such fillers can have the countervailing effect of reducing the flexibility, compliance, and fluidity of the elastomer and reducing shape adaptability or moldability. The flexibility and fluidity of the elastomer relate to the extrudability and workability of the elastomer into useful products, such as seals for industrial oil and gas applications. They also relate to the ability of the elastomer to conform to nonplanar surfaces in a device, resulting in the desired sealing functions. Consequently, there is a need for an elastomer with improved physical properties. Such properties would include, for example, flexibility, moldability, and elastic recovery similar to the unfilled elastomer, high thermal degradation temperature, high activation energy for thermal degradation, lower glass transition temperature, improved resistance to swelling or deterioration in fluids such as oils and industrial solvents, reduced permeability of gases, increased storage and loss modulus, increased stiffness, increased fracture strength, sealing force retention, extrusion or creep, dimensional recovery and dimensional set. An elastomeric composition exhibiting a combination of all of these seemingly incompatible properties would be desirable for use in the high-pressure and variable temperature industry of petrochemical production.

SUMMARY OF THE INVENTION

In one aspect, this invention provides elastomeric compositions with significantly improved fracture properties and thermal stability compared with conventional carbon-black-filled elastomers. The invention recognizes, among other things, that filler particles that are predominantly two-dimensional in shape exhibit significantly improved thermal and mechanical properties as compared with conventional fillers such as natural clay, carbon black, and carbon fiber. In addition, the elastomeric compositions of the invention exhibit improved resistance to solvent-induced swelling and to unwanted permeation of gases such as hydrogen sulfide.

In another aspect, this invention provides an elastomeric composition that contains an elastomeric component comprising one or more elastomers and a filler component. The filler component contains a plurality of two-dimensional particles dispersed in the elastomeric component.

In another aspect, the invention provides a method of forming an elastomeric composition. The method comprises the step of combining an elastomeric component comprising one or more elastomers with a filler component, wherein the filler component comprises a plurality of two-dimensional particles, such that the two-dimensional particles become dispersed in the elastomeric component, thereby forming the elastomeric composition.

In yet another aspect, the invention provides a method of preparing an elastomeric article. The method comprises the step of combining an elastomeric component comprising one or more elastomers and a filler component comprising a plurality of two-dimensional particles, such that the two-dimensional particles become dispersed in the elastomeric component to form an elastomeric composition. Optionally, one or more additives selected from the group consisting of vulcanizing agents, accelerators, antidegradants, retarders, inhibitors, processing aids, adhesion promoters, tackifiers, antistatic agents, flame retardants, and colorants may be included in the elastomeric composition to form an elastomeric composition. The method also includes the steps of molding the elastomeric composition into a shape, and curing the elastomeric composition to form the elastomeric article.

BRIEF DESCRIPTION OF THE DRAWINGS

The present technology will be better understood upon reading the following detailed description of non-limiting embodiments thereof, and upon examining the accompanying drawings described below:

FIG. 25A shows the strain profile during cyclic loading and unloading. The measured stress response is shown in FIG. 25B. FIG. 25C shows the stress versus strain plots for the cyclic strain profile and for monotonic linear strain profile (dashed curve). FIG. 25D shows the dissipated energy fraction for each cycle of the cyclic testing.

FIG. 26A shows the strain profile during cyclic loading and unloading. The measured stress response is shown in FIG. 26B. FIG. 26C shows the stress versus strain plots for the cyclic strain profile and for monotonic linear strain profile (dashed curve). FIG. 26D shows the dissipated energy fraction for each cycle of the cyclic testing.

FIG. 27A shows the strain profile during cyclic loading and unloading. The measured stress response is shown in FIG. 27B. FIG. 27C shows the stress versus strain plots for the cyclic strain profile and for monotonic linear strain profile (dashed curve). FIG. 27D shows the dissipated energy fraction for each cycle of the cyclic testing.

DETAILED DESCRIPTION

Figure 1:
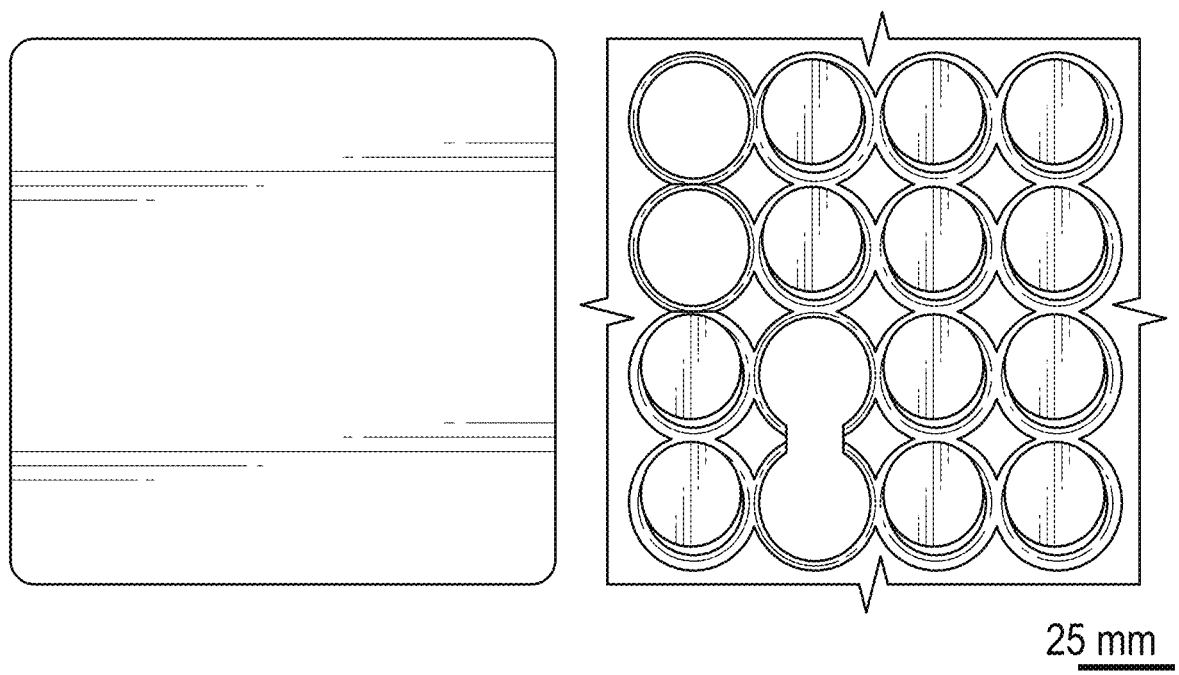
FIG. 1. Compression molded sheets and cylindrical specimens of the elastomer composites.

The present invention provides filled elastomeric compositions that possess improved mechanical and physical properties for a wide range of pressure and temperature applications over previous filled elastomer compositions.

The elastomeric compositions of the invention comprise an elastomeric component that comprises at least one elastomer. Elastomers are rubber or elastomeric polymers, polymers which have glass transition temperatures below their use temperature. It should be understood that while the elastomeric component in some embodiments of the invention comprises only one elastomer, elastomer blends comprising two or more different elastomers are also expressly contemplated by the invention. In general, the initial choice of a suitable elastomer (or elastomers) will depend on factors such as the proposed operating conditions, the chemical environment to which the elastomer(s) will be subjected, raw material costs, and the like. With this in mind, thermosetting elastomers may be used in certain embodiments of the invention. Saturated rubber elastomers may also be used because they possess superior properties at high temperatures and are less subject to degradation due to the substantial absence of double-bonds. In addition, for certain applications where chemical resistance to oil is desired, the chosen elastomer may comprise polar groups, such as acrylonitrile, in addition to non-polar groups. Non-limiting examples of elastomers that may be used include alkyl acrylate copolymers, bromobutyl polymers, polybutadiene, isoprene, chloroprene, isobutylene-isoprene copolymers, polyisobutylene, polynorbornene, norbornene copolymers, chlorinated polyethylenes, chlorobutyl polymers, chlorosulfonyl polyethylene, nitrile, nitrile butadiene rubber (NBR), ethylene propylene diene monomer (EPDM) rubber, polyoctenamers, polysiloxanes, polyurethanes, fluoroelastomers, carboxylated nitrile elastomers (CNBR or XNBR), and epichlorohydrin rubber, to name just a few. In certain embodiments, the elastomer comprises a hydrogenated nitrile elastomer (hydrogenated nitrile butadiene rubber, HNBR) such as those sold under the trade name ZETPOL® or CHEMISTAT® (Zeon Chemicals L.P., Louisville, Ky.). HBNR elastomers such as ZETPOL® or CHEMISTAT® may be used when the elastomeric composition is to be used as a seal or gasket in a valve, blowout preventer, or similar device used in oil and gas recovery. In certain embodiments the elastomeric component may comprise a vulcanizing agent before it is mixed with a filler component as described herein.

In certain embodiments, the elastomer compositions of the invention comprise a filler component that comprises one or more fillers. The term "filler" refers to a solid particulate material that is added to the elastomer(s) of the invention for imparting functional characteristics to the elastomer(s), including mechanical, chemical, thermophysical and other physical properties. In certain embodiments, the filler is present in an amount sufficient to improve crack initiation resistance by at least 30%, 40%, 50%, 60%, 70%, 80% 90%, 100%, 110%, 120%, 130%, 140%, 150%, or even about 160% compared to conventional fillers such as natural clay, carbon black, and carbon fiber. In certain embodiments, tear resistance may be improved by 50%, 100%, 150%, 200%, 250%, 300%, 350%, 400%, 450%, 500%, 550%, 600%, 650%, or about 700% compared to conventional fillers such as natural clay, carbon black, and carbon fiber. In certain embodiments, resistance to stress may be improved by 30%, 40%, 50%, 60%, 70%, 80% 90%, 100%, 110%, 120%, 130%, 140%, 150%, 160%, 170%, 180%, 190%, or even about 200% compared to elastomers filled with bentonite or halloysite clays or conventional fillers such as natural clay, carbon black, and carbon fiber. In certain embodiments, modulus of toughness may be improved by between 2, 4, 6, 8, 10, 12, 14, 16, 18, 20, 22, 24, 26, 28, or even about 30 times compared to the unfilled elastomer or conventional fillers such as natural clay, carbon black, and carbon fiber. In certain embodiments, the elastomer may exhibit higher stiffness at lower strain and lower stiffness at higher strain compared to elastomers filled with conventional fillers such as carbon fibers and carbon black. In certain embodiments, the elastomer may exhibit a lower glass transition temperature, whereby it is more flexible and rubbery at lower temperatures but stiffer and less flexible at higher temperatures than elastomers filled with bentonite and halloysite clays.

In certain embodiments, the fillers of the invention are comprised of a layered material. In this context, a "layered material" is a material that contains covalently bonded atoms arranged in discrete layers that are held together by non-covalent forces. Non-limiting examples of layered materials contemplated by the invention include hexagonal boron nitride (h-BN), molybdenum disulfide, graphite, and layered mineral silicates. Examples of suitable layered mineral silicates include phyllosilicates with a sheet-like structure, such as montmorillonite or mica. In the case of graphite, for example, the graphitic carbon sheets that collectively form the graphite are held together by van der Waals forces. In the case of montmorillonite, aluminosilicate layers approximately 1 nm thick, each of which is comprised of two tetrahedral sheets of silica surrounding an octahedral sheet of alumina, are held together by interlayer cations. Without wishing to be bound by theory, it is believed that using such layered materials in the elastomeric compositions of the invention is advantageous because the layered materials may exfoliate (i.e., delaminate) when the elastomeric composition is subjected to physical stress, thereby helping to dissipate strain energy by this mechanism, rather than by increase in crack surface area, and thus increase fracture toughness. Again, without wishing to be limited by theory, it is believed that the exfoliation (also referred to as delamination) of the layered materials may help to preserve the physical and chemical integrity of the elastomeric composition under operating conditions.

In certain embodiments, the filler is comprised of "two-dimensional" particles, and preferably particles comprising a layered material. To be considered a two-dimensional particle, one dimension of the particle is typically confined to the 0.3-100 nm range, whereas the other two orthogonal directions may be significantly larger in size (e.g., in the range of 300-600 nm, 1-5 microns, 2-10 microns, 1-100 microns, 5-100 microns, or even 10-500 microns). In general, when the filler particles are comprised of a layered material (e.g., graphite) the smallest dimension of a "two-dimensional" particle is in the direction that runs perpendicular to the layers that constitute the layered material (i.e., the thickness). In the case of graphite, a single layer of graphene has a thickness of approximately 0.3 to 0.4 nm, but often the two-dimensional graphite particles of the invention contain two or more layers of graphene.

One aspect of the invention is the recognition that a filler material may be chemically treated prior to combining with the elastomer(s) in order to impart improved chemical and/or physical properties to the elastomeric composition. For example, when the filler is comprised of particles of layered mineral silicates, the polar surface of the filler may make it difficult to disperse the filler uniformly in a non-polar elastomer. In such cases, the filler may be chemically treated to render the surfaces of the filler particles more non-polar to facilitate dispersing the filler within the non-polar elastomer. Such surfaces may include the outer surfaces of the filler particles along with the surfaces at any of the gallery regions separating the layers of the layered mineral silicate. Reactions to modify polar surfaces of layered mineral silicates may include ionic bonding of organoamines or siloxamines to the polar layered mineral silicate surfaces, 1,3-dipolar cycloaddition of azides and terminal alkynes, organosiloxane-based surface-functionalization chemistry, silane-based chemistry, and radical polymerization chemistry, to name just a few. In certain useful embodiments, the filler particles may be surface-functionalized using silane chemistries as known in the art to render their surfaces more non-polar. For instance, the chemical treatment may comprise surface-functionalizing montmorillonite clay particles having a size of less than about 20 microns by exposing the montmorillonite clay particles to a solution comprising aminopropyltriethoxysilane and octadecylamine, such that the particles comprise around 0.5-5 wt % aminopropyltriethoxysilane and around 15-35 wt % octadecylamine after functionalization. A blend of ethanol and water may be used in the preparation of the solution of the amines, and the surface functionalization of the clay platelets may be accompanied by stirring and heating. Such particles are sold commercially under the trade name NANOMER® (e.g., NANOMER® I.31PS) by Nanocor, Inc. (Hoffman Estates, Ill.). The NANOMER® I.31PS surface-functionalized nanoclay is referred to as "nanoclay" in the following examples to distinguish it from other types of clay, such as bentonite and halloysite. However, it is to be understood that the NANOMER® I.31PS nanoclay is but one exemplary species of the genus of particles of layered mineral silicates.

Surface-functionalization of layered clay particles may result in the expansion of gallery spacing between the layers and increase the particles' ability to intercalate with an elastomer or to exfoliate (i.e., delaminate) into separate layers. Intercalation is the process by which a first material is inserted into the layered structure of a second material. Without wishing to be bound by theory, it is believed that the surface-functionalization of montmorillonite by aminopropyltriethoxysilane and octadecylamine results in the intercalation of these chemicals between the layers of montmorillonite and a concomitant expansion in the gallery spacing of the layers. Further, the polymer segments of the elastomer are believed to intercalate between the layers of non-polar two-dimensional filler particles when the particles are mixed into the elastomeric material. Again, without wishing to be limited by theory, it is believed that the filler particles, by intercalating with the elastomer and/or by exfoliating into two-dimensional platelets in the elastomer structure, effectively act as plasticizers. It is also believed that the exfoliation is facilitated by the non-polar character of the nanographite and nanoclay particles. By enabling directional flow and slippage of the filler particle layers across the interlayer spaces (called the galleries in the case of clay particles), it is believed that mechanical properties and resistance to stress are increased. Two-dimensional particles are believed to form diffusional barriers within the elastomer, reducing the permeability of the material and increasing the activation energy required for degradation of the material. Swelling resistance may also be improved by the inclusion of these two-dimensional particle fillers.

In certain embodiments, the filler comprises nanographite particles. In certain embodiments, the nanographite particles have a thickness in the range of 0.3-100 nm, and a particle diameter in the range of 1-5 microns, 1-10 microns, 5-50 microns or 10-100 microns.

The present invention also provides a method of manufacturing an elastomeric composition. The method includes combining at least one elastomer with at least one two-dimensional filler in a manner that disperses the two-dimensional filler(s) throughout the elastomer(s). In certain embodiments, a vulcanizing agent, such as a peroxide-based thermal initiator, is also added. In certain embodiments, the elastomeric component comprises a vulcanizing agent before it is mixed with a filler. Such vulcanizing agents may be supported on a clay substrate. The invention also contemplates adding an accelerator, an activator, a retarder, and an antidegradant to the elastomeric composition. Antidegradants include antioxidants, such as 4,4'-bis($\alpha,\alpha$-dimethylbenzyl)diphenyl amine, and antiozonants that slow down deterioration of the elastomer upon exposure to oxygen, ozone, heat, and light. Vulcanizing agents, such as sulfur and some organic peroxides, are the primary compounds that result in the formation of crosslinks during the curing process. Accelerators are generally organic compounds, such as N,N'-m-phenylene-bis-maleimide (m-PBM) and tetramethylthiuram disulfide (TMTD), that can accelerate the rate of curing. Activators are additives, such as zinc oxide and stearic acid, that activate the accelerators. Retarders slow down the rate of curing and impart longer scorch time to the elastomer. ASTM D 3853, which is incorporated by reference in its entirety, lists additional additives that may be included in the elastomeric composition. Intermediate elastomeric compositions, comprising an elastomeric component and a filler component, are contemplated as embodiments, wherein the addition of one or more additional components, such as a vulcanizing agent, an accelerator, a retarder or an antioxidant, may be necessary prior to the formation of a filled elastomeric polymer. In general an intermediate composition may not contain sufficient cross-linking as the final filled elastomeric polymer composition and may require further processing before use as an elastomeric product, such as a valve, seal, or elastomeric packing unit. In certain embodiments, the elastomeric component of the intermediate elastomeric composition may comprise a vulcanizing agent even before the elastomeric component is combined with a filler component, as described herein. If desired, other additives may be added to the elastomeric composition, non-limiting examples of which include plasticizers, processing aids, flame retardants, adhesion promoters, tackifiers, antidegradants, vulcanizing agents, activators, accelerators, retarders, inhibitors, antistatic agents, colorants, and the like. A variety of conventional compounding methods may be utilized to disperse the filler particles (and any other additives that may be present) within the elastomer(s) of the elastomeric composition. Non-limiting examples of suitable compounding equipment includes open mill mixers, internal mixers, and continuous mixers. Open mill mixers operate by forcing the elastomer and filler material through two cylindrical rollers, rolling toward each other. The gap between the rollers is designed to be small enough such that the ingredients build up and mix just above the gap. Internal mixers are totally enclosed and utilize internal rotors to blend the elastomer mixture together. Continuous mixers operate similarly to screw extruders by blending the elastomer mixture together as they are passed along and between two parallel screws. For each of these mixing methods, the elastomeric component is typically added first to ensure homogeneity and soften it to accommodate the fillers. In addition, each mixing method does work on the elastomer mixture, so caution should be observed that the mixture's temperature does not exceed safe levels and cause harm to equipment or cause the mixture to degrade. Mixing devices may incorporate refrigeration or heating mechanisms to ensure the mixing is occurring at a desired temperature. Mixing may be halted to add additional fillers, additional additives such as vulcanizing agents or other additives as described herein, or to adjust the mixture temperature.

Once mixing is completed, an elastomeric article comprising the elastomeric composition of the invention may be formed by traditional methods, non-limiting examples of which include extrusion molding, injection molding, compression molding, blow molding, transfer molding, rotational molding, matrix molding, thermoforming, heat sealing, embossing, stamping, and combinations thereof. Compression molding entails pressing an uncured blank elastomer with a hydraulic press in a heated mold. Injection molding entails preheating uncured elastomer and injecting it into a mold at a precise amount, temperature, and time. Transfer molding is the use of a hydraulic press to force an uncured blank elastomer into a desired mold.

The ratio between filler and elastomer material may vary over a wide range, and is not particularly limited, as long as the amount of elastomer is sufficient to maintain desired elastomeric physical properties for the contemplated application. Suitable ranges include those where the mass of filler per 100 grams of elastomer (parts per hundred or "phr") may be about 1 gram to about 95 grams, about 10 grams to about 80 grams, about 20 grams to about 55 grams, or about 30 grams to 45 grams. Various embodiments of the invention presently contemplated to be useful include those having a mass of filler that is 5, 10, 15, 20, 25, 30, 35, 40, 45, 50, 55, 60, or 70 grams per 100 grams of elastomer (phr), with the understanding that these amounts, when taken together in pairs, define sub-ranges that are explicitly contemplated by the invention. It is to be understood that, depending on the polymer, a filled elastomer with very high filler concentration could exhibit inferior properties, such as loss of cohesion or crumbling. It is well within the skill of a person having ordinary skill in the art to adjust filler composition accordingly in view of this disclosure. It is to be further understood that the chosen amount of filler is usually taken to improve one or more physical properties of the filled elastomeric composition as a whole. For example, a sufficient amount of the filler component to improve crack initiation resistance of the filled elastomer may be 5, 10, 15, 20, 25, 30, 35, 40, 45, 50, 55, 60, or 70 phr. A sufficient amount of the filler component to improve the tear resistance of the filled elastomer may be 5, 10, 15, 20, 25, 30, 35, 40, 45, 50, 55, 60, or 70 phr. A sufficient amount of the filler component to improve the maximum dissipated energy fraction at 100% strain of the filled elastomer may be 5, 10, 15, 20, 25, 30, 35, 40, 45, 50, 55, 60, or 70 phr. A sufficient amount of the filler component to improve the stress/strain properties of the filled elastomer may be 5, 10, 15, 20, 25, 30, 35, 40, 45, 50, 55, 60, or 70 phr. This amount may also be sufficient to increase the activation energy necessary for thermal degradation of the filled elastomer, the filled elastomer's resistance to solvent-induced swelling, and the filled elastomer's resistance to unwanted permeation of gases and liquids.

The filled elastomer composition may be utilized to manufacture various seals and gaskets where improved properties may be beneficial, such as when both high strength and flexibility are needed across a wide range of temperatures and pressures. For example, the filled elastomer composition may be utilized in the seals and gaskets in a petrochemical production well. In particular, the seals and gaskets involved in a blowout preventer (BOP) may be constructed of the elastomeric composition of the invention to improve their strength and ability to close tightly. BOPs may utilize two types of mechanisms requiring elastomeric seals (packing) to seal a wellbore: (1) ram blowout preventers and (2) annular blowout preventers. Ram blowout preventers generally function by actuating two rams (perpendicular to the direction of the wellbore) together to restrict or seal the wellbore. Sealing rams are known as blind rams. These rams may also be designed in an annular shape to fit around a drill pipe but still seal the wellbore. Each of these rams is fitted with elastomeric packers that must be able to withstand very high pressures when sealing against the pressure of a well. Conversely, annular BOPs act by forcing a donut-shaped rubber seal (elastomeric packing unit) to constrict, typically via hydraulic pistons, and thereby sealing the wellbore entirely or closing around a drill pipe. For either of these BOP types, high strength elastomers are essential. Additionally, for the annular BOP, the elastomeric packing unit must be sufficiently extrudable, i.e., sufficiently flexible to be forced closed by the pistons of the BOP. If the elastomeric packing unit lacks this necessary extrudability, the BOP could fail to seal properly and risk a blowout of the well. These elastomeric packing units, gaskets, and sealing members within valves and the like are collectively defined as "seals."

The foregoing aspects, features, and advantages of the present technology will be further appreciated when considered in reference to the following description of certain embodiments and accompanying drawings. In describing the embodiments of the technology illustrated in the drawings, specific terminology will be used for the sake of clarity. The invention, however is not intended to be limited to specific terms used, and is understood that each specific term includes equivalents that operate in a similar manner to accomplish a similar purpose.

EXAMPLE 1

Preparation of Samples

HNBR composites comprising different fillers were compounded using a Banbury mixer and a two roll mill. Here, the two-dimensional fillers that were used were nanographite and montmorillonite nanoclay (NANOMER® I.31PS nanoclay from Nanocor, Ltd.) which is surface-functionalized with octadecylamine and aminopropyltriethoxysilane. The surface-functionalized nanoclay particles had initial particle dimensions in the range of 14-18 microns. In general, however, size reduction may occur during compounding with elastomer. For purposes of comparison, an unfilled HNBR sample was prepared and HNBR composites using halloysite clay and bentonite clay (each without surface modification) were also prepared. Halloysite clay (one-dimensional, 1D, CAS no. 1332-58-7) has a tube like morphology, rendering it effectively one-dimensional (like carbon fibers), with an outer diameter of 50-60 nm and an inner diameter of 12-15 nm. Each tube is constructed of layers of aluminosilicate. It has a high aspect ratio and possesses hydroxyl surface-functionalization, such that the tube surfaces are polar. Bentonite (CAS no. 1302-78-9) is an alumina phyllosilicate clay comprising montmorillonite, illite, and kaolinite, among other clays. The bentonite used in the elastomers of the present study was NANOMER® PGV Bentonite, purchased from Nanocor, Inc., and is of high purity (>98% montmorillonite). Both unmodified halloysite and bentonite are polar, which limited their capacity to disperse in non-polar polymers. In addition to the halloysite- and bentonite-based composites, carbon-based composites involving carbon-black (N550, CAS no. 1333-86-4) and carbon fiber (AGM 94, CAS no. 7440-44-0) were also prepared.

For each HNBR composite, mixing of the filler and the HNBR was performed using a Banbury mixer. The Banbury mixing was done in two steps. In the first step, the base polymer (HNBR) and the respective filler were mixed at 104° C. and 90 rpm. After the first mixing, the sample was cooled and again mixed in the internal mixer at 88° C. and at 75 rpm, after adding the peroxide-based vulcanizing agent and the remaining components of the HNBR composite, the 4,4'-bis($\alpha,\alpha$-dimethylbenzyl)diphenyl amine; N,N'-m-phenylene-bis-maleimide; stearic acid; and zinc oxide. After each of these composites had been mixed, they were pressed into sheets using a roll mill, and finally vulcanized for 20 min at 140° C. using compression molding to obtain sheets that were approximately 150 mm×150 mm in area and 2 mm thick, and cylinders that were 29 mm in diameter and about 12.5 mm in height (see FIG. 1). Table 1 and Table 2 illustrate the compositions of the HNBR elastomers HNBR-UF, HNBR-HNT, HNBR-BENT, HNBR-NC, and HNBR-CB, each filled with 45 grams of filler per 100 grams of elastomer (45 phr). If unspecified, all elastomers are filled with 45 phr of the respective filler.

TABLE 1

Compositions (in parts per hundred, "phr," of the polymer) of the tested HNBR elastomer composites containing clay fillers.

| Sample name | HNBR (without filler) HNBR-UF | HNBR + halloysite nanotubes HNBR-HNT | HNBR + bentonite HNBR-BENT | HNBR + surface-functionalized nanoclay HNBR-NC |
|---|---|---|---|---|
| HNBR (ZETPOL ® 2020) | 100 | 100 | 100 | 100 |
| Filler | — | 45 | 45 | 45 |
| 4,4'-Bis($\alpha,\alpha$-dimethylbenzyl)diphenyl amine (NAUGARD ® 445) | 2.60 | 2.60 | 2.60 | 2.60 |
| N,N'-m-Phenylene-bis-maleimide (HVA-2) | 0.90 | 0.90 | 0.90 | 0.90 |
| Stearic acid | 0.90 | 0.90 | 0.90 | 0.90 |
| Zinc oxide | 0.90 | 0.90 | 0.90 | 0.90 |
| Peroxide vulcanizing agent (VUL-CUP ® 40KE) | 13.20 | 13.20 | 13.20 | 13.20 |

TABLE 2

Composition (in parts per hundred of the polymer) of the tested HNBR elastomer composites containing carbon-based fillers

| Sample name | HNBR (without filler) HNBR-UF | HNBR + carbon fiber HNBR-CF | HNBR + nanographite HNBR-NG | HNBR + carbon black HNBR-CB |
|---|---|---|---|---|
| HNBR (ZETPOL ® 2020) | 100 | 100 | 100 | 100 |
| Filler | — | 45 | 45 | 45 |
| 4,4'-Bis(α,α-dimethylbenzyl)diphenyl amine (NAUGARD ® 445) | 2.60 | 2.60 | 2.60 | 2.60 |
| N,N'-m-phenylene-bis-maleimide (HVA-2) | 0.90 | 0.90 | 0.90 | 0.90 |
| Stearic acid | 0.90 | 0.90 | 0.90 | 0.90 |
| Zinc oxide | 0.90 | 0.90 | 0.90 | 0.90 |
| Peroxide vulcanizing agent (VUL-CUP ® 40KE) | 13.20 | 13.20 | 13.20 | 13.20 |

EXAMPLE 2

Scanning Electron Microscopy Images of Carbon-Based Fillers

Figure 2:
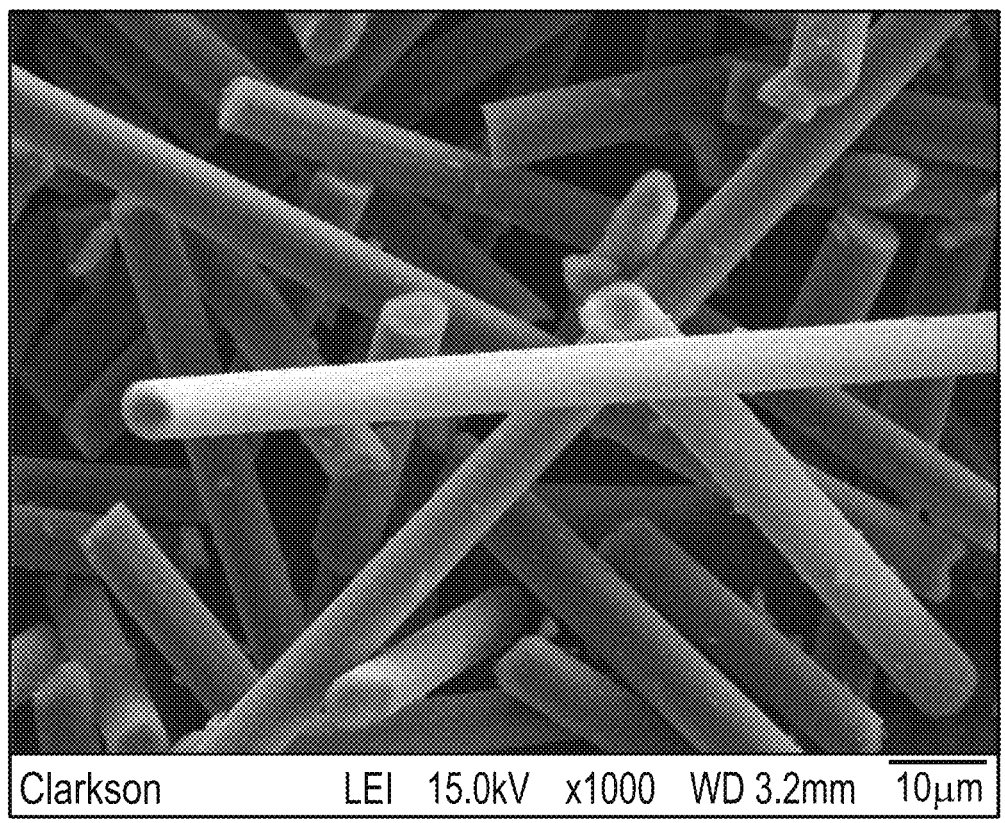
FIG. 2. Scanning electron microscopy image of carbon fibers.
Figure 3:
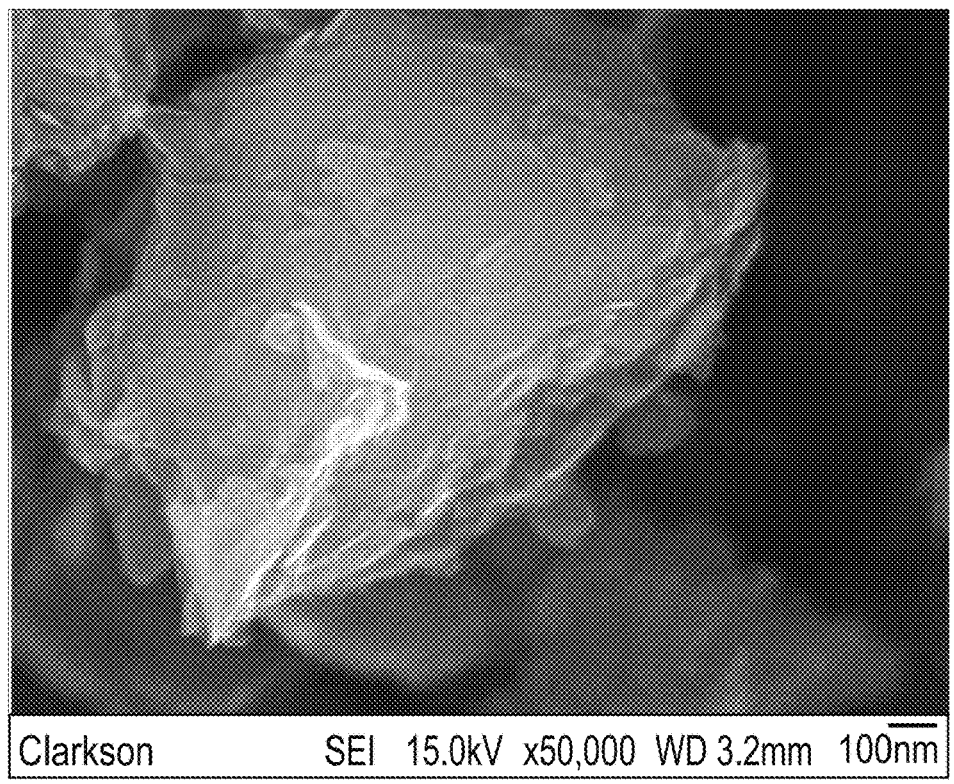
FIG. 3. Scanning electron microscopy image of nanographite particles used in the elastomer compositions of the present invention.
Figure 4:
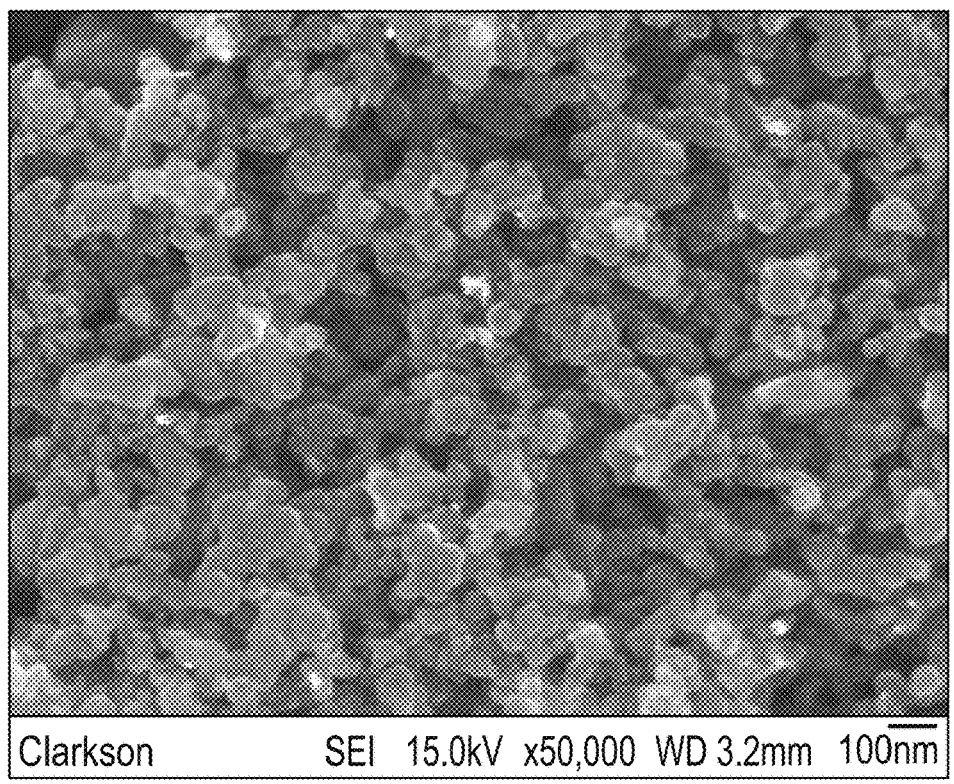
FIG. 4. Scanning electron microscopy image of carbon black particles.

FIGS. 2-4 show scanning electron microscopy (SEM) images of carbon fibers (FIG. 2), graphite (FIG. 3), and carbon black (FIG. 4) fillers used in Example 1. Carbon fiber (AGM 94, CAS no. 7440-44-0), with a fiber length of approximately 150 μm and a fiber diameter of 7-9 μm was used as a representative one-dimensional filler. Nanographite (Nano 24, CAS no. 7782-42-5) with a Brunauer-Emmett-Teller (BET) surface area of 350 $m^2 g^{-1}$ and 99% carbon content was used as representative two-dimensional filler, having an average number of graphene layers per particle of about 7.5, estimated by dividing the theoretical surface area of graphene (2630 $m^2 g^{-1}$) by the BET surface area. Carbon black (N550, CAS no. 1333-86-4), with oil absorption number of 92-cc $mg^{-1}$ and iodine number of 121 mg $g^{-1}$ was used as representative three-dimensional filler.

EXAMPLE 3

Tensile and Compression Testing of Elastomers

Figure 5:
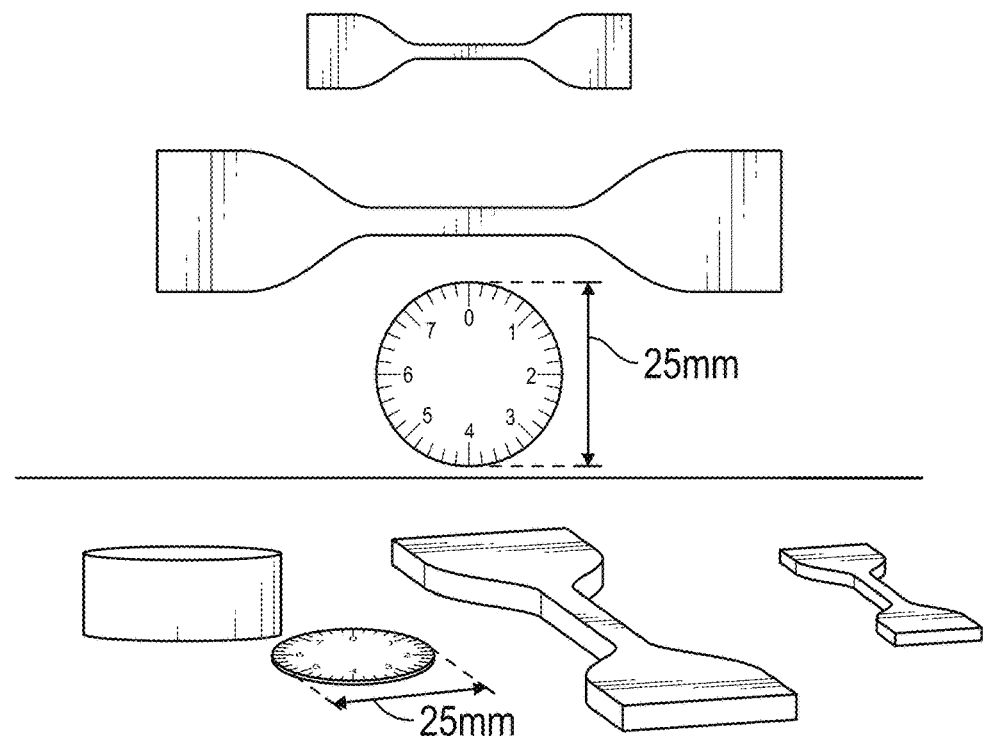
FIG. 5. Diagrams of dog-bone shaped and cylindrical specimens used in tensile and compression tests.
Figure 6:
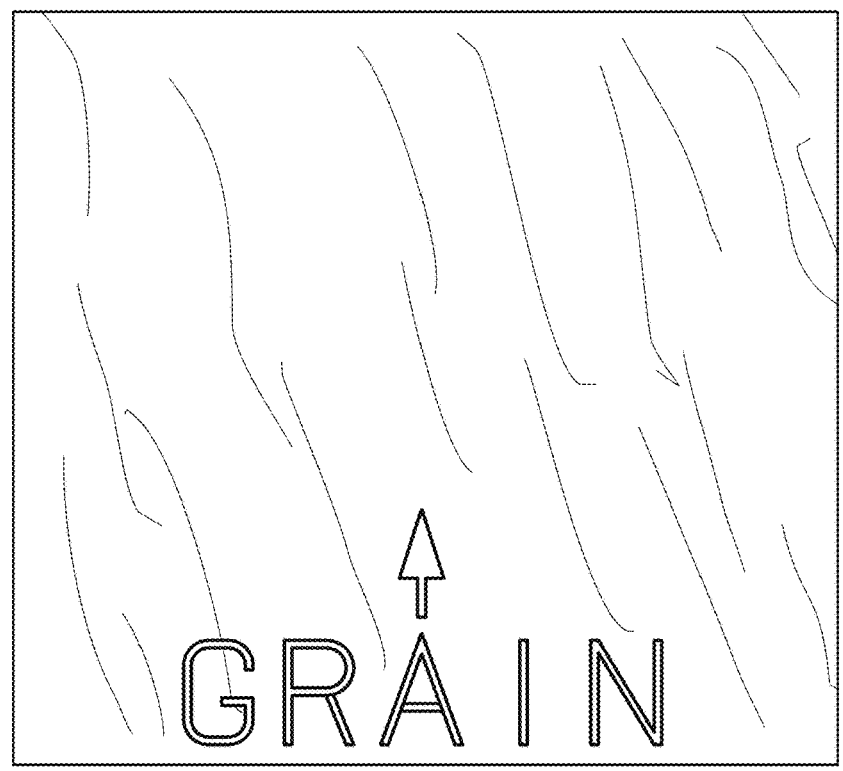
FIG. 6. Diagrams of the grain direction in a compression molded sheet of an elastomer filled with carbon fibers. The grain direction (i.e., the direction of alignment of the filler particles, for example, carbon fibers) corresponds to the direction of processing the elastomer in a two-roll mill.

A Universal Testing Machine (Instron 5900R, Instron, Norwood, Mass.) equipped with a 30 kN load cell and a pair of tension grips (or compression platens) was used for tensile and compression testing of the elastomers. A high-temperature furnace was installed on the load frame to conduct the tests at different temperatures and gas environments (air, nitrogen, or argon). The 30 kN load cell was used to measure loads, and the crosshead movement was used for measuring the displacement. FIG. 5 shows diagrams of the test specimens used. In the case of carbon fibers, samples punched out in directions parallel to and perpendicular to the machining direction (corresponding to the direction in which the elastomer was fed into the two roll mill), were used. See FIG. 6, where the direction of the grain (i.e., the direction of alignment of the filler particles, for example, carbon fibers) is marked.

EXAMPLE 4

Thermogravimetric Analysis

A PerkinElmer Pyris 1 Thermogravimetric Analyzer was used to test Thermogravimetry (TG). The sample (10 to 15 mg in mass) was heated in a platinum pan under nitrogen flow (20 $cm^3$ $minute^{-1}$) at standard ambient temperature and pressure) from 25° C. to 700° C. at a heating rate of 10° C. $minute^{-1}$ to obtain the mass loss TG data. The derivative of the mass loss versus temperature data (dm/dT) was used to determine the peak decomposition temperature, $T_{max}$. The activation energy for thermal degradation was determined by performing non-isothermal TG experiments at heating rates of 5, 10, 15 and 20° C. $minute^{-1}$. These experiments were carried out in an argon environment.

Figure 7:
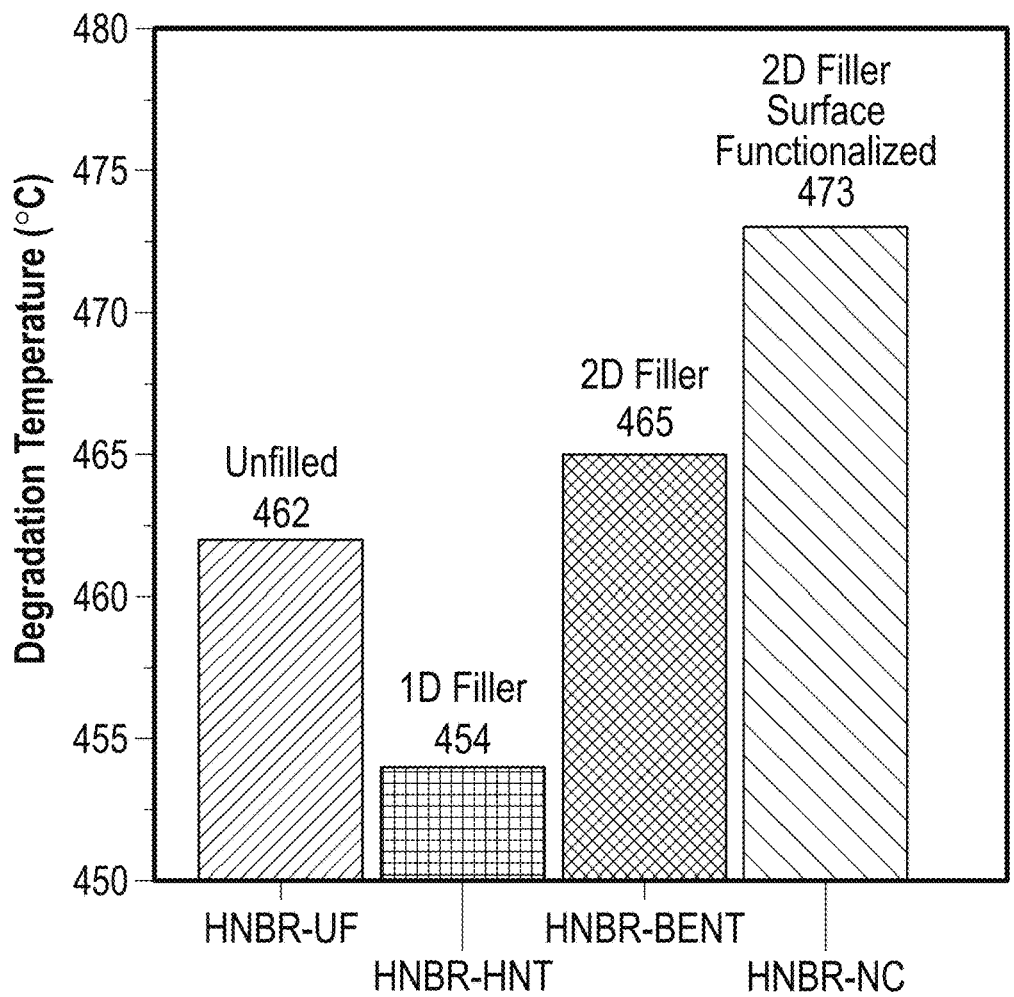
FIG. 7. A graph showing the temperatures corresponding to the maximum rates of thermal degradation for various elastomeric compositions, including an elastomer filled with halloysite nanotube (HNBR-HNT), an elastomer filled with bentonite (HNBR-BENT), an elastomer filled with surface-functionalized nanoclay (HNBR-NC), and an elastomer without these fillers (HNBR-UF). The compositions of these elastomers are given in Table 1. The maximum thermal degradation temperatures were measured using a heating rate of 10° C./minute.

FIG. 7 shows the results of TG analysis on the elastomer composites containing three different types of clay particles, and of compositions given in Table 1. The surface-functionalized nanoclay particles (sample HNBR-NC) exhibited higher thermal degradation temperature compared with the elastomer samples containing the other two types of clay particles (HNBR-HNT and HNBR-BENT) and also compared with the HNBR elastomer without these particles.

EXAMPLE 5

Peak Decomposition Temperature

Table 3 compares the peak decomposition temperature of the samples HNBR-UF, HNBR-CB, HNBR-NG, and HNBR-NC, based on the maximum rate of mass loss in the different elastomer composite samples determined using a heating rate of 10° C. $minute^{-1}$. The compositions of these samples are given in Table 1 and Table 2. The surface-functionalized nanoclay was found to have the highest peak decomposition temperature.

TABLE 3

Comparison of Peak Decomposition Temperature of HNBR Composites

| Material | HNBR-UF | HNBR-CB | HNBR-NG | HNBR-NC |
|---|---|---|---|---|
| $T_{max}$ (° C.) | 462 | 469 | 467 | 473 |

EXAMPLE 6

Activation Energy of Thermal Degradation Reaction

Figure 8:
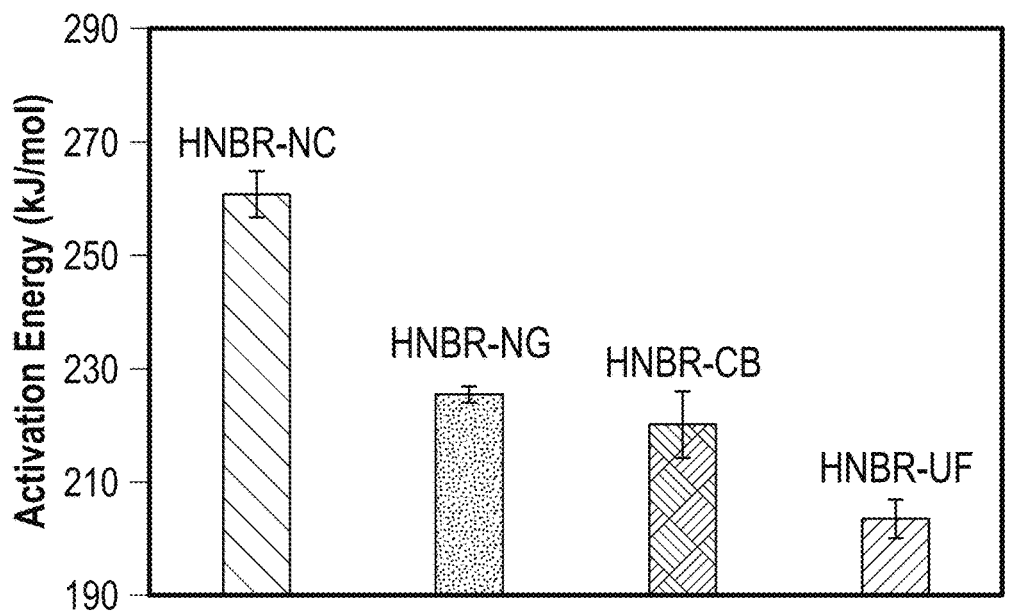
FIG. 8. A graph comparing the activation energies of thermal degradation reactions of elastomer samples HNBR-UF, HNBR-CB, HNBR-NG, and HNBR-NC reported in in Table 1 and Table 2.

FIG. 8 compares the activation energy of the thermal degradation reaction of selected elastomer samples, of compositions in Table 1 and Table 2. The activation energy values were calculated using the Flynn-Wall-Ozawa method. The elastomer containing the surface-functionalized nanoclay particles exhibited significantly higher activation energy of the thermal degradation reaction compared with the elastomer samples containing nanographite and carbon black, and also the HNBR elastomer that did not contain these fillers. The activation energy for thermal degradation was about 35 kJ/mol higher for HNBR-NC and about 5 kJ/mol higher for HNBR-NG than HNBR-CB.

EXAMPLE 7

Dynamic Mechanical Analysis

Dynamic mechanical analysis (DMA) was performed using a TA Instrument Q800 DMA instrument. Rectangular specimens of dimensions 20×12.8×1.9 mm³ were punched out of the compression molded sheets. These specimens were annealed in a vacuum oven at 100° C. for 12 hours before testing. Temperature sweep and frequency sweep studies were performed in the dual cantilever mode. The temperature sweep studies were carried out over a temperature range of −150° C. to 200° C. at a heating rate of 2° C. minute$^{-1}$, 1 Hz strain frequency, and a strain amplitude of 0.1%.

Figure 9:
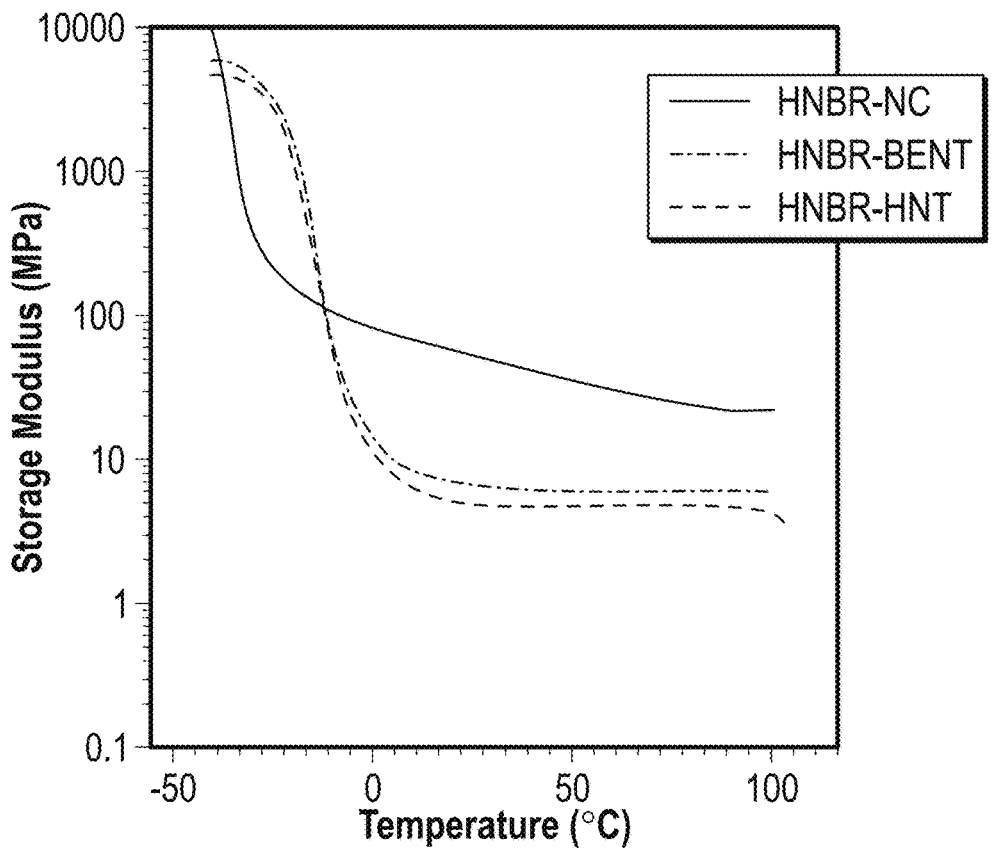
FIG. 9. Comparison of storage modulus of HNBR composites filled with halloysite nanotube (HNBR-HNT), bentonite (HNBR-BENT), and surface-functionalized nanoclay (HNBR-NC), measured using dynamic mechanical thermal analysis. All samples contained a filler particle concentration of 45 phr (45 grams of the specified filler for every 100-gram of the polymer).

FIG. 9 shows the dynamic mechanical properties of HNBR elastomers filled with three different types of clay particles listed in Table 1, namely, halloysite tubes (in HNBR-HNT), bentonite (in HNBR-BENT), and surface-functionalized nanoclay (in HNBR-NC), over a temperature range of −30° C. to 100° C. The elastomer HNBR-NC had a lower glass transition temperature ($T_g$), yet a higher storage modulus at temperatures in the range of 0° C. to 100° C. compared with HNBR-HNT and HNBR-BENT composites. This combination of qualities is particularly beneficial for blow out prevention (BOP) devices in the petrochemical industry, which must withstand high pressures but yet seal tightly. In particular, both ram and annular BOP devices benefit from these qualities to ensure full sealing and closure of the BOP.

EXAMPLE 8

Tensile Properties of Clay-Filled Elastomers

Figure 10:
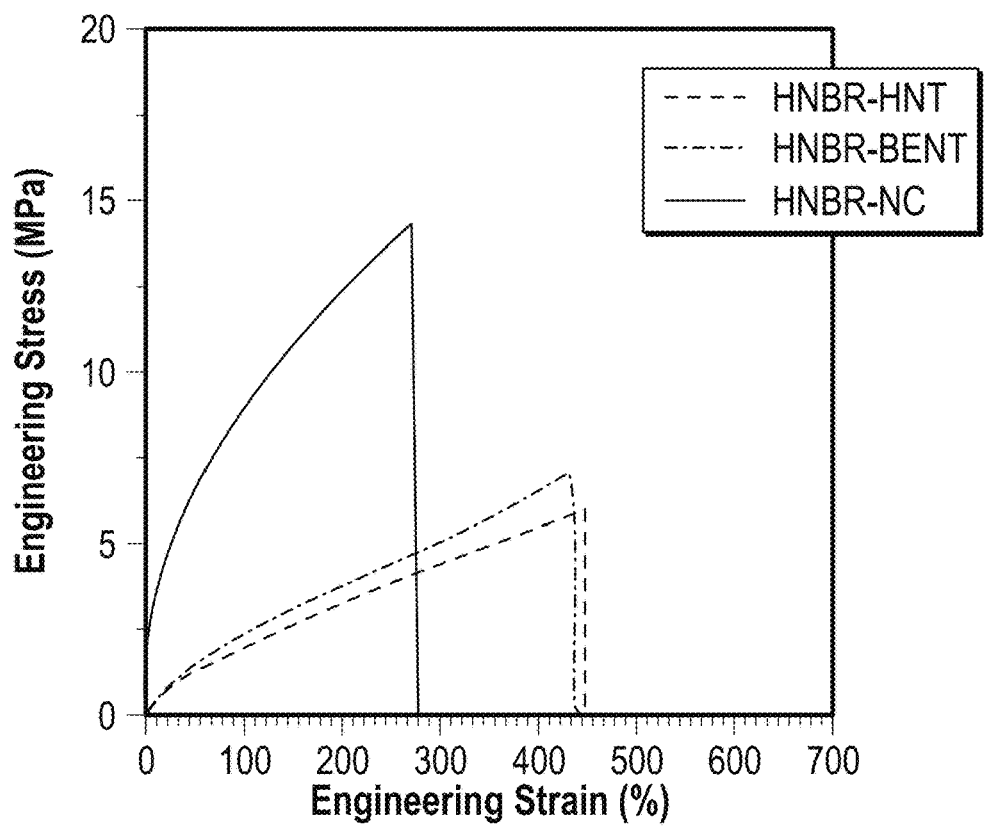
FIG. 10. Stress versus strain plot of HNBR composites reinforced with halloysite nanotube (HNBR-HNT), bentonite (HNBR-BENT), and surface-functionalized nanoclay (HNBR-NC). Uniaxial tensile testing was done using an extension rate of 500 mm/min. The measurements were conducted at room temperature on dog-bone shaped specimens. All samples contained the same filler concentration (45 phr).

FIG. 10 shows the room temperature measurements of stress versus strain in HNBR elastomers filled with the three different types of clay particles listed in Table 1. All filled-elastomers contained the same concentration of filler (45 phr). The elastomer filled with surface-functionalized clay particles was significantly stiffer than the other two samples.

EXAMPLE 9

Figure 11:
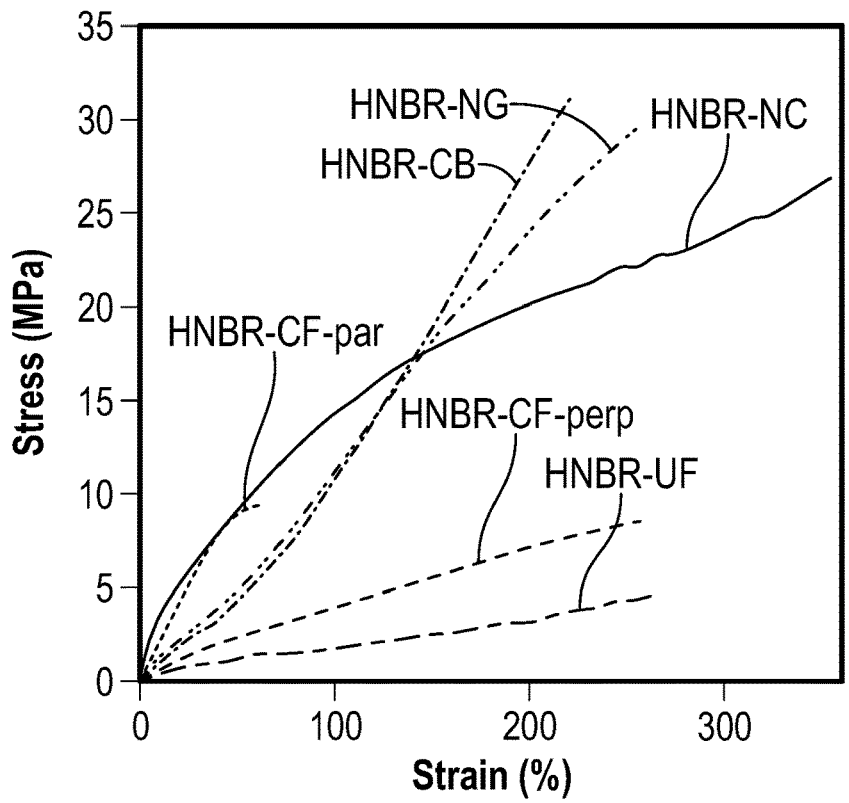
FIG. 11. Stress versus strain data, acquired at room temperature and using an extension rate of 500 mm/min, for HNBR elastomers unfilled (HNBR-UF) and those filled with surface-functionalized nanoclay (HNBR-NC), nanographite (HNBR-NG) carbon black (HNBR-CB), and carbon fibers (HNBR-CF). HNBR-CF-par denotes measurements on carbon fiber-filled HNBR done parallel to the grain direction (see FIG. 6), and HNBR-CF-perp denotes measurements perpendicular to the grain direction. All samples contained the same filler concentration (45 phr).

Comparison of Mechanical Properties of HNBR-NC in Uniaxial Tension with Elastomers Containing Other Types of Fillers FIG. 11 shows representative tensile testing data for different elastomer samples acquired at room temperature and an extension rate of 500 mm/min. The tests were conducted to compare the mechanical properties of HNBR-NC in uniaxial tension with elastomers containing other types of fillers. It is seen that the elastomer filled with surface-functionalized nanoclay had a higher stiffness at lower strains (and lower stiffness at higher strains) compared with the elastomer filled with carbon black.

Figure 12:
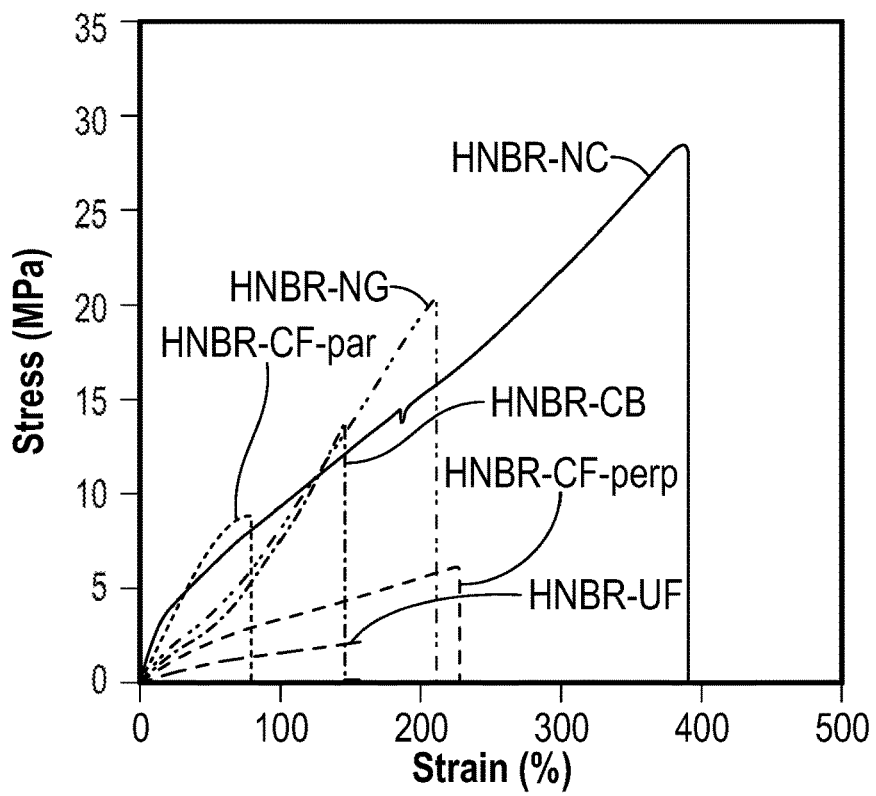
FIG. 12. Stress versus strain data, acquired at room temperature and an extension rate of 5 mm/min, for HNBR elastomers unfilled (HNBR-UF) and those filled with surface-functionalized nanoclay (HNBR-NC), nanographite (HNBR-NG), carbon black (HNBR-CB), and carbon fibers (HNBR-CF). HNBR-CF-par denotes measurements on carbon fiber-filled HNBR done parallel to the grain direction (see FIG. 6), and HNBR-CF-perp denotes measurements perpendicular to the grain direction. All samples contained the same filler concentration (45 phr).

FIG. 12 shows the results of the same measurements performed using an extension rate of 5 mm/min. HNBR-CF-perp and HNCF-CF-par refer to elastomers filled with carbon fibers according to Table 2 and tested perpendicularly to the grain direction and parallel to the grain direction, respectively.

EXAMPLE 10

Modulus of Toughness

Figure 13:
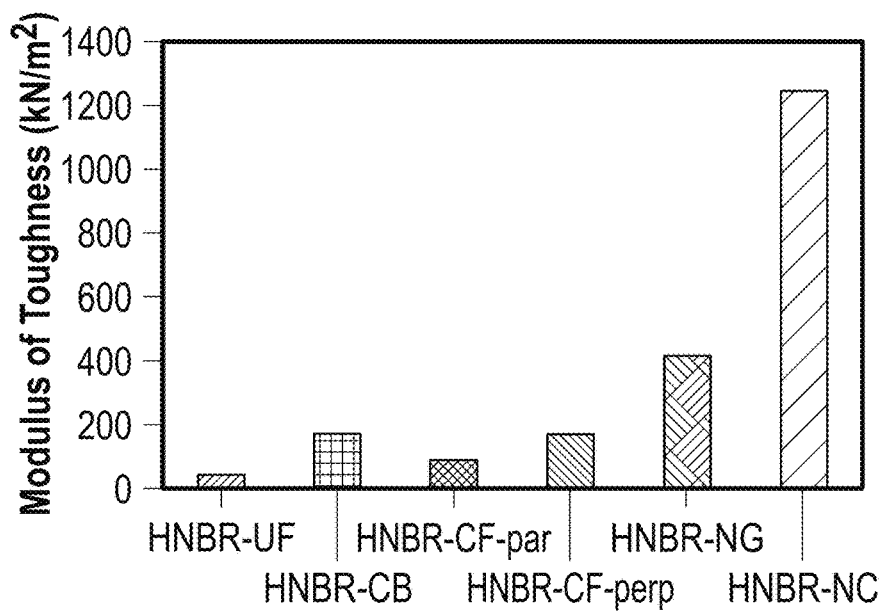
FIG. 13. Area under the stress versus strain plot in uniaxial tensile testing experiments for HNBR elastomers unfilled (HNBR-UF) and those filled with surface-functionalized nanoclay (HNBR-NC), nanographite (HNBR-NG), carbon black (HNBR-CB), and carbon fibers (HNBR-CF). HNBR-CF-par denotes measurements on carbon fiber-filled HNBR done parallel to the grain direction (see FIG. 6), and HNBR-CF-perp denotes measurements perpendicular to the grain direction. An extension rate of 5 mm/min was used.

FIG. 13 compares the area under the stress versus strain plot (until the point of break) of the data reported in FIG. 12. This area is a measure of the fracture toughness of the elastomer sample, the modulus of toughness. The modulus of toughness is a measure of a material's ability to absorb energy in the plastic range of the material. It is evident that the elastomer filled with surface-functionalized nanoclay was significantly tougher compared with HNBR-UF (approximately 29 times), HNBR-NG (about 3 times), or HNBR-CF (14 or 7 times, depending on whether the measurement was made parallel or perpendicular to the grain direction, respectively). It was also significantly tougher (about 7 times) than the elastomer filled with conventional carbon black (sample HNBR-CB). The elastomer filled with nanographite (HNBR-NG) was also significantly tougher than HNBR-UF (approximately 10 times), HNBR-CB (about 2 times), or HNBR-CF (4 or 2 times, depending on whether the measurement was made parallel or perpendicular to the grain direction, respectively).

EXAMPLE 11

Crack Initiation and Crack Propagation Resistance

Figure 14:
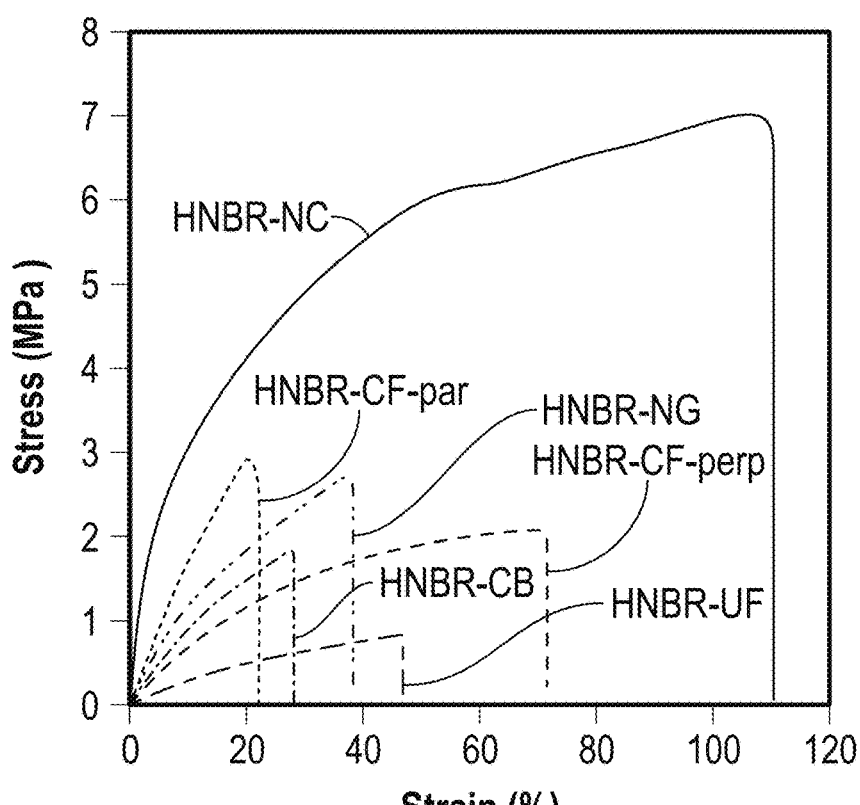
FIG. 14. Load-displacement curves obtained from quasistatic fracture tests on Single Edge Notched Tension (SENT) test specimens of HNBR elastomers unfilled (HNBR-UF) and those filled with surface-functionalized nanoclay (HNBR-NC), nanographite (HNBR-NG), carbon black (HNBR-CB), and carbon fibers (HNBR-CF). HNBR-CF-par denotes measurements on carbon fiber-filled HNBR done parallel to the grain direction (see FIG. 6), and HNBR-CF-perp denotes measurements perpendicular to the grain direction.
Figure 15:
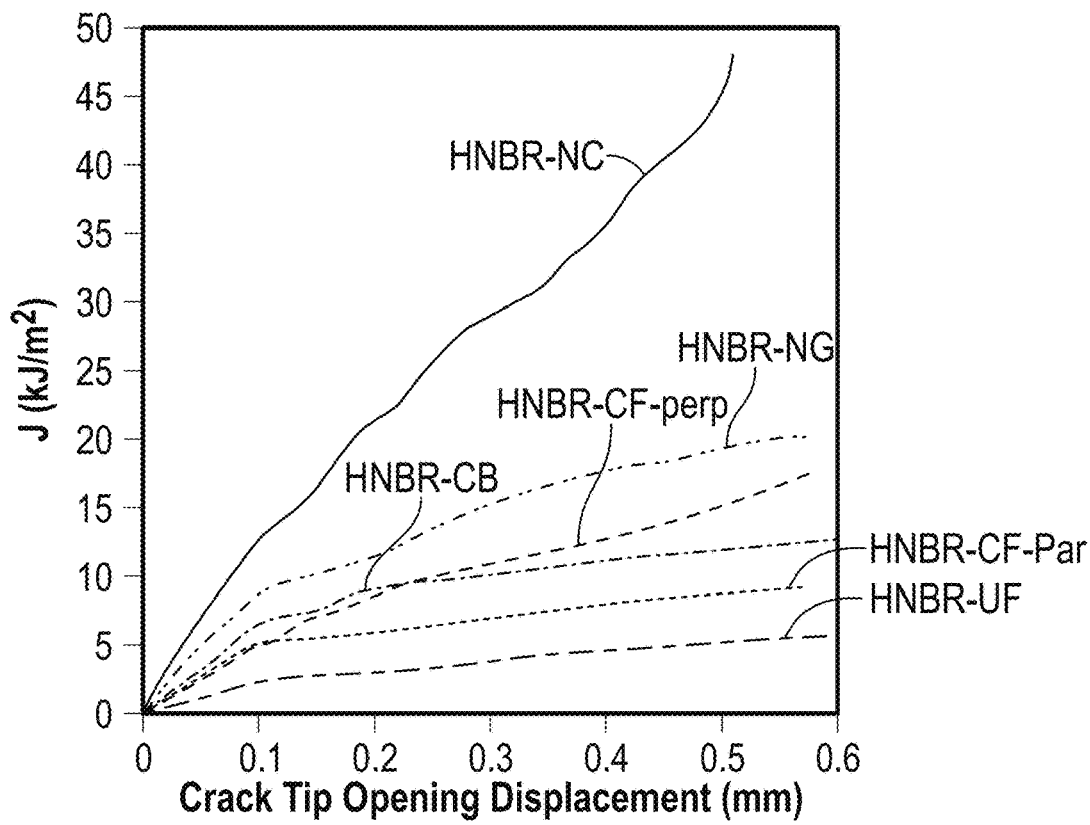
FIG. 15. J-integral versus CTOD from room temperature quasistatic fracture tests on SENT test specimens of HNBR elastomers unfilled (HNBR-UF) and those filled with surface-functionalized nanoclay (HNBR-NC), nanographite (HNBR-NG), carbon black (HNBR-CB), and carbon fibers (HNBR-CF). HNBR-CF-par denotes measurements on carbon fiber-filled HNBR done parallel to the grain direction (see FIG. 6), and HNBR-CF-perp denotes measurements perpendicular to the grain direction.

Table 4 gives the experimental parameters of the study used to compare the crack initiation and crack propagation resistance of HNBR elastomers filled with different filler particles. SENT test specimens were used in quasistatic fracture tests at room temperature. FIG. 14 shows representative load versus displacement data for elastomers filled with different fillers. The elastomer filled with surface-functionalized nanoclay (HNBR-NC) showed remarkably higher fracture toughness in these measurements. A plot of the J-integral versus crack tip opening displacement (CTOD) for these measurements is shown in FIG. 15. The figure illustrates that the J-integral values were the highest for HNBR-NC at all crack tip opening displacements, with J-integral values being second-highest for the HNBR-NG.

TABLE 4

Experimental parameters in quasistatic fracture tests at room temperature using SENT test specimens

| Specimen dimensions (mm) | | | | | |
|---|---|---|---|---|---|
| Total length | Length (Distance between clamped ends) | Width | Thickness | Initial crack length | Extension rate |
| 100 | 50 | 15 | 2 | 2 mm | 5 mm/min |

Table 5 compares the crack initiation resistance, $J_{IC}$, which is defined herein as the value of the J-integral at a CTOD of 0.1 mm, among HNBR elastomers filled with different fillers. The crack initiation resistance of HNBR-NC, the elastomer filled with surface-functionalized nanoclay, was approximately two times that of the elastomer filled with conventional carbon black filler (HNBR-CB) and approximately 5.5 times that of the HNBR elastomer without these fillers.

TABLE 5

Crack initiation resistance of HNBR elastomers filled with different fillers

| | $J_{IC}$ (kJ/m$^2$) |
|---|---|
| HNBR-UF | 2.27 |
| HNBR-CF-par | 4.95 |
| HNBR-CF-perp | 4.74 |
| HNBR-CB | 6.59 |
| HNBR-NG | 8.76 |
| HNBR-NC | 12.59 |

Table 6 compares the tear resistance of HNBR elastomer samples filled with different fillers. The tear resistance, $T_R$, is defined as the slope of the J-integral versus CTOD curve at a CTOD of 0.25 mm. The tear resistance of the HNBR-NC is about eight times higher than that of HNBR-CB and about 11 times higher than that of HNBR-UF. The elastomer composite that contained the graphite particles, HNBR-NG, also showed a high value of tear resistance compared to the HNBR-UF, HNBR-CF-par, HNBR-CF-perp, and HNBR-CB elastomers.

TABLE 6

Tear Resistance HNBR elastomer samples filled with different fillers

| | $T_R$ (MPa) |
|---|---|
| HNBR-UF | 7.5 ± 2.6 |
| HNBR-CF-par | 9.9 ± 0.8 |
| HNBR-CF-perp | 22.8 ± 4.5 |
| HNBR-CB | 10.4 ± 4.3 |
| HNBR-NG | 37.3 ± 2.1 |
| HNBR-NC | 80.9 ± 3.5 |

Table 7 gives the compositions (in parts per hundred of the polymer) of the HNBR elastomer composites containing surface-functionalized nanoclay in different concentrations. These compositions were each tested for crack initiation resistance and tear resistance, the results of which are described in Tables 8 and 9. As depicted below, the surface-functionalized nanoclay samples demonstrated higher crack initiation resistance and tear resistance than the conventional carbon black filled elastomer, HNBR-CB, even at lower filler concentrations.

Table 8 below compares the crack initiation resistance, $J_{IC}$, which is defined herein as the value of the J-integral at a CTOD of 0.1 mm, between the elastomers described in Table 7 and HNBR-CB. The experimental parameters of the study used to compare the crack initiation and crack propagation resistance are given in Table 4. SENT test specimens were used. The crack initiation resistance of HNBR-NC-45 phr, the elastomer filled with 45 phr of the surface-functionalized nanoclay, was approximately two times that of the elastomer filled with conventional carbon black filler with the same filler concentration (HNBR-CB-45 phr). Furthermore, the crack initiation resistance of HNBR-NC-30 phr, i.e., the elastomer filled with 30 phr of the surface-functionalized nanoclay, was also higher, approximately 1.5 times, than that of the elastomer filled with 45 parts per hundred resin of the carbon black filler (HNBR-CB-45 phr).

TABLE 8

Crack initiation resistance of HNBR elastomers with different nanoclay concentrations

| | $J_{IC}$ (kJ/m$^2$) |
|---|---|
| HNBR-NC-5phr | 2.14 |
| HNBR-NC-10phr | 3.31 |
| HNBR-NC-20phr | 5.85 |
| HNBR-NC-30phr | 10.2 |
| HNBR-NC-45phr | 12.5 |
| HNBR-CB-45phr | 6.59 |

Table 9 below compares the tear resistance of the elastomer samples of Table 7 with HNBR-CB. The tear resistance, $T_R$, is defined as the slope of the J-integral versus CTOD curve at a CTOD of 0.25 mm. The tear resistance of HNBR-NC-45 phr, the elastomer filled with 45 phr of the surface-functionalized nanoclay, was approximately eight times that of the elastomer filled with conventional carbon black filler with the same filler concentration (HNBR-CB-45 phr). Furthermore, the tear resistance of HNBR-NC-30 phr, the elastomer filled with 30 phr of the surface-functionalized nanoclay, was also higher, approximately five times, than that of the elastomer filled with 45 parts per hundred resin of the carbon black filler (HNBR-CB-45 phr).

TABLE 7

Compositions of the HNBR elastomer composites containing surface-functionalized nanoclay in different concentrations

| Sample name | 5 phr nanoclay HNBR-NC-5phr | 10 phr nanoclay HNBR-NC-10phr | 20 phr nanoclay HNBR-NC-20phr | 30 phr nanoclay HNBR-NC-30phr | 45 phr nanoclay HNBR-NC-45phr |
|---|---|---|---|---|---|
| HNBR (ZEPTOL® 2020) | 100 | 100 | 100 | 100 | 100 |
| Filler | 5 | 10 | 20 | 30 | 45 |
| 4,4'-Bis(α,α-dimethylbenzyl)diphenyl amine (NAUGARD® 445) | 2.60 | 2.60 | 2.60 | 2.60 | 2.60 |
| N,N'-m-phenylene-bis-maleimide (HVA-2) | 0.90 | 0.90 | 0.90 | 0.90 | 0.90 |
| Stearic acid | 0.90 | 0.90 | 0.90 | 0.90 | 0.90 |
| Zinc oxide | 0.90 | 0.90 | 0.90 | 0.90 | 0.90 |
| Peroxide vulcanizing agent (VUL-CUP® 40KE) | 13.20 | 13.20 | 13.20 | 13.20 | 13.20 |

TABLE 9

Tear resistance of HNBR elastomers with different nanoclay concentrations

|  | $T_R$ (MPa) |
|---|---|
| HNBR-NC-5phr | 6.34 |
| HNBR-NC-10phr | 16.8 |
| HNBR-NC-20phr | 17.1 |
| HNBR-NC-30phr | 52.6 |
| HNBR-NC-45phr | 80.9 |
| HNBR-CB-45phr | 10.4 ± 4.3 |

The $J_{IC}$ and $T_R$ values of a commercially available filled NBR elastomer (McMaster-Carr, oil-resistant high-temperature NBR rubber) were also evaluated using the experimental parameters given in Table 4. They were found to be 6.7 kJ/m² and 28.3 MPa respectively, which are significantly lower than the HNBR-NC-45 phr, HNBR-NC-30 phr, and HNBR-NG-45 phr materials of the present invention, as seen in Table 5, Table 6, Table 8, and Table 9.

EXAMPLE 12

Characterization of the Mechanical Properties of the Elastomer Composites

Universal Testing Machine (Instron 5900R, Instron, Norwood, Mass.) with a 100 kN load cell was used to characterize the mechanical property of the elastomer composites. High-temperature studies were done using a furnace [Applied Test Systems (ATS), Butler, Pa.] fitted to the load frame. Uniaxial compression tests were done using compression platens of diameter 5 cm on elastomer compression disks of dimensions 29 mm×12.7 mm (diameter×thickness). The compression disks were made by compression molding the test material using a custom made mold. Stoner dry film mold release lubricant (E408) from Stoner Corporation, Quarryville, Pa. was used during compression testing. The lubricant was sprayed on the compression platens and on the compression disks before testing. The samples were mounted onto the fixture after the desired testing temperature is reached and were allowed to equilibrate for 30 minutes after which the tests were conducted. The tests were programmed using Bluehill 3 software module from Instron. The displacement was measured by the crosshead movement, and the load cell was used to record the load requirements during tests.

Figure 16:
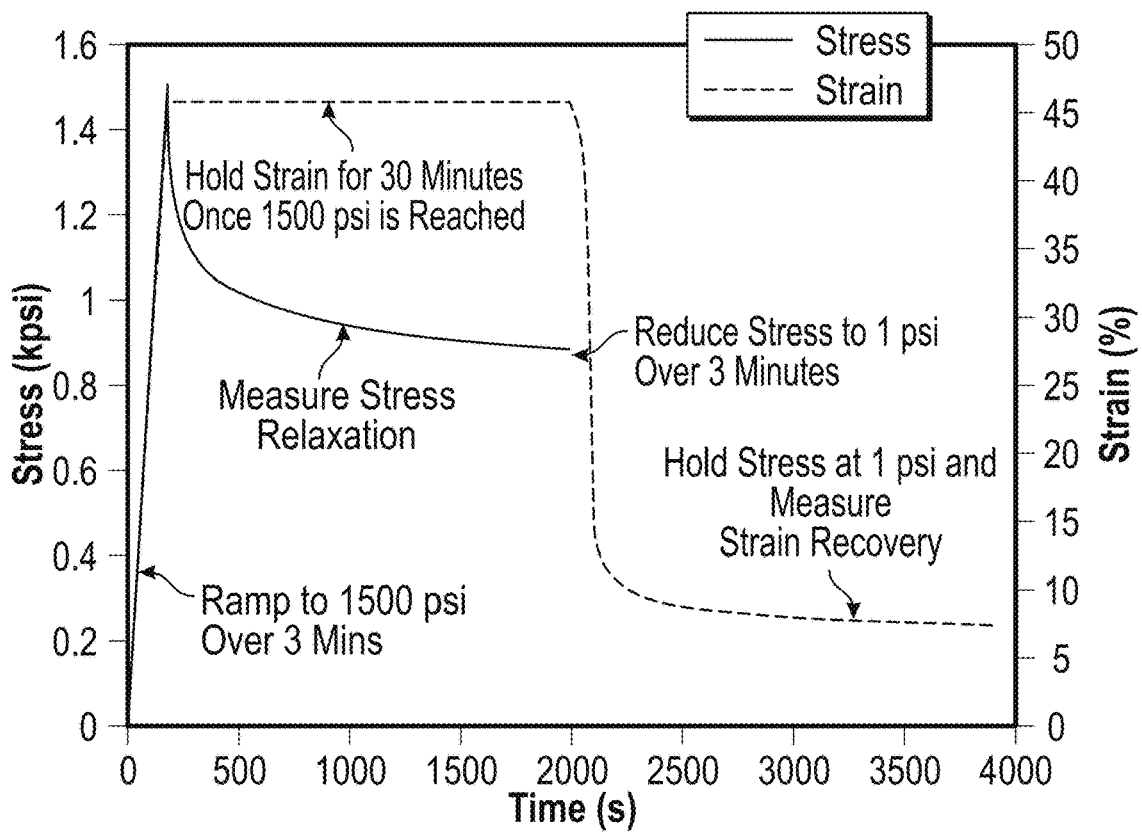
FIG. 16. Schematic representation of the protocols used to obtain stress versus time and strain versus time data acquired during compression testing of elastomers, including an elastomer filled with halloysite nanotube (HNBR-HNT), an elastomer filled with bentonite (HNBR-BENT), an elastomer filled with surface-functionalized nanoclay (HNBR-NC), and an elastomer without these fillers (HNBR-UF).

FIG. 16 provides a schematic example of stress versus time and strain versus time data acquired during compression testing of an elastomer for extrudability. This figure illustrates the experimental procedure followed to test the stress versus strain and stress versus time for certain elastomeric compositions as shown in FIG. 17.

Table 10 shows parameters from a stress relaxation test that was performed at room temperature (25° C.) and an elevated temperature (180° C.). Strain % at 1500 psi is a measure of the stiffness of the elastomer. It is higher for a more compliant (less stiff) material. The stress relaxation after 30 minutes is determined by the difference in stress from the beginning of the hold period (1500 psi) and the ending value. It is a measure of the ability of the elastomer to adapt to a given compressive strain via stress relaxation. Residual strain is the permanent set the sample incurs from testing after the 30 minute recovery period. "Residual strain" characterizes the residual, permanent deformation in the material after removing the applied compressive stress. A lower value indicates higher shape recovery.

Figure 17:
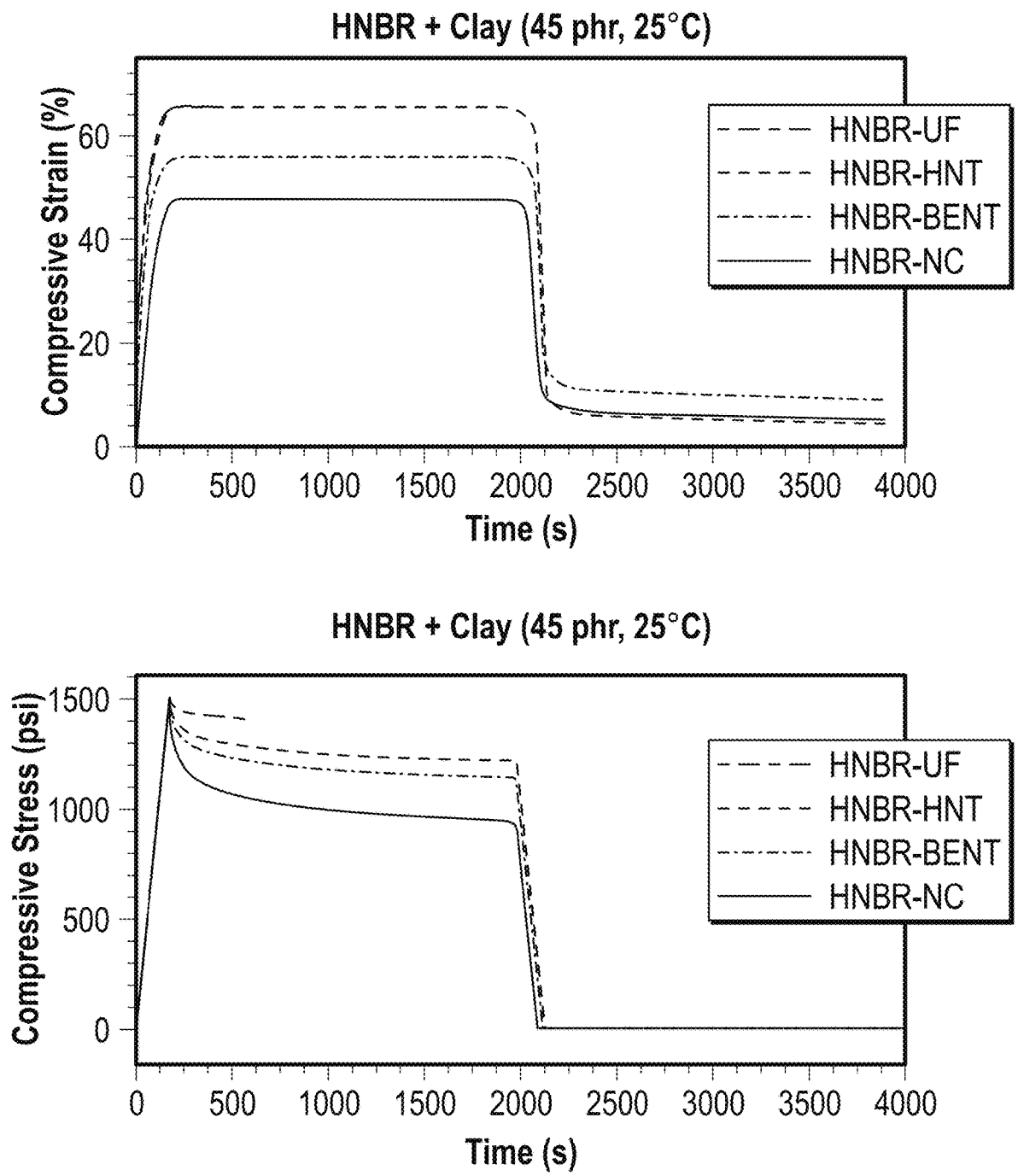
FIG. 17. Strain versus time and stress versus time profiles during compression testing of elastomers, including an elastomer filled with halloysite nanotube (HNBR-HNT), an elastomer filled with bentonite (HNBR-BENT), an elastomer filled with surface-functionalized nanoclay (HNBR-NC), and an elastomer without these fillers (HNBR-UF).

FIG. 17 depicts the strain versus time and stress versus time profiles during compression testing of three different HNBR/clay composite elastomers compared with unfilled HNBR elastomer.

TABLE 10

Stress Relaxation Test Performed at 25° C. and 180° C.

| 25° C. | HNBR + nanographite HNBR-NG-45phr | HNBR + carbon black HNRB-CB-45phr | HNBR + carbon fiber HNBR-CF-45phr | HNBR (without filler) HNBR-UF |
|---|---|---|---|---|
| Strain % at 1500 psi | 45.60% | 46.00% | 35.30% | 65.10% |
| Stress relaxation at 30 minutes | 253 psi | 223 psi | 261 psi | Failed during relaxation |
| Residual strain | 2.91% | 1.58% | 5.53% |  |

| 180° C. | HNBR-NG-45phr | HNRB-CB-45phr | HNBR-CF-45phr | HNBR-UF |
|---|---|---|---|---|
| Strain % at 1500 psi | 39.40% | 37.10% | Failed During Loading | Failed During Loading |
| Stress relaxation at 30 minutes | 164 psi | 126 psi |  |  |
| Residual strain | 4.42% | 1.86% |  |  |

| 25° C. | HNBR + surface-functionalized nanoclay HNBR-NC-45phr | HNBR + bentonite HNBR-BENT-45phr | HNBR + halloysite nanotubes HNBR-HNT-45phr |
|---|---|---|---|
| Strain % at 1500 psi | 49.10% | 55.20% | 65.50% |
| Stress relaxation at 30 Minutes | 555 psi | 353 psi | 276 psi |
| Residual strain | 6.86% | 8.85% | 5.00% |

Figure 18:
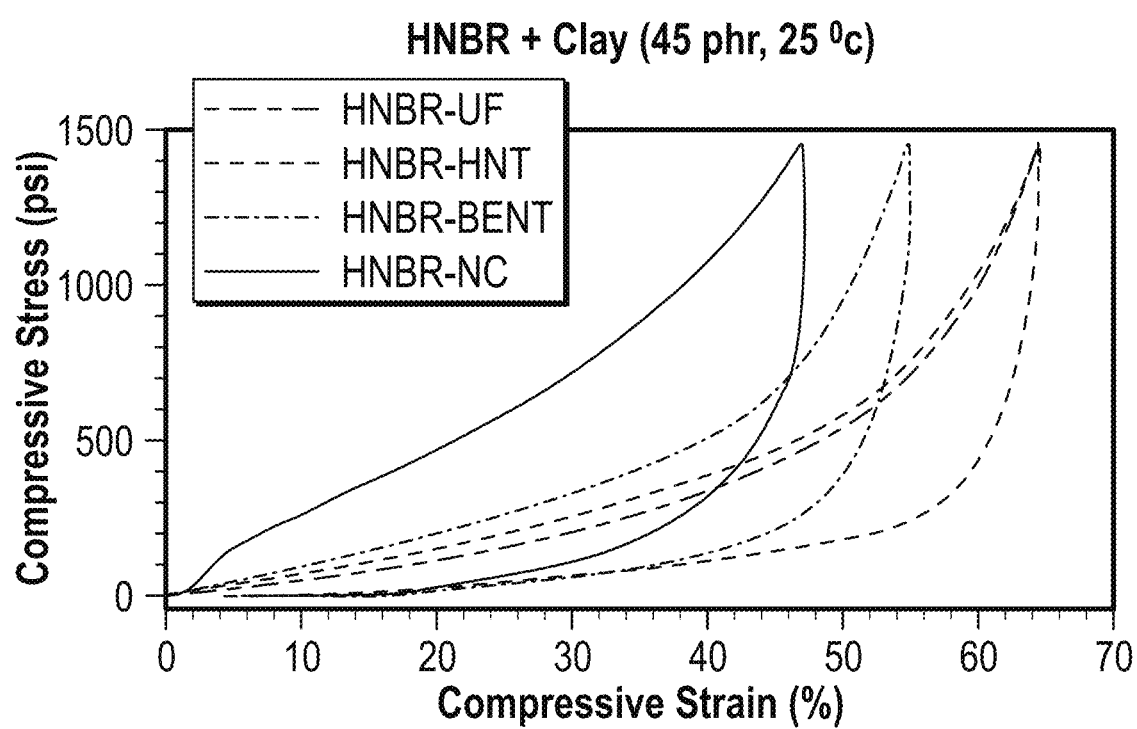
FIG. 18. Stress versus strain profiles of elastomers, including an elastomer filled with halloysite nanotube (HNBR-HNT), an elastomer filled with bentonite (HNBR-BENT), an elastomer filled with surface-functionalized nanoclay (HNBR-NC), and an elastomer without these fillers (HNBR-UF).
Figure 19:
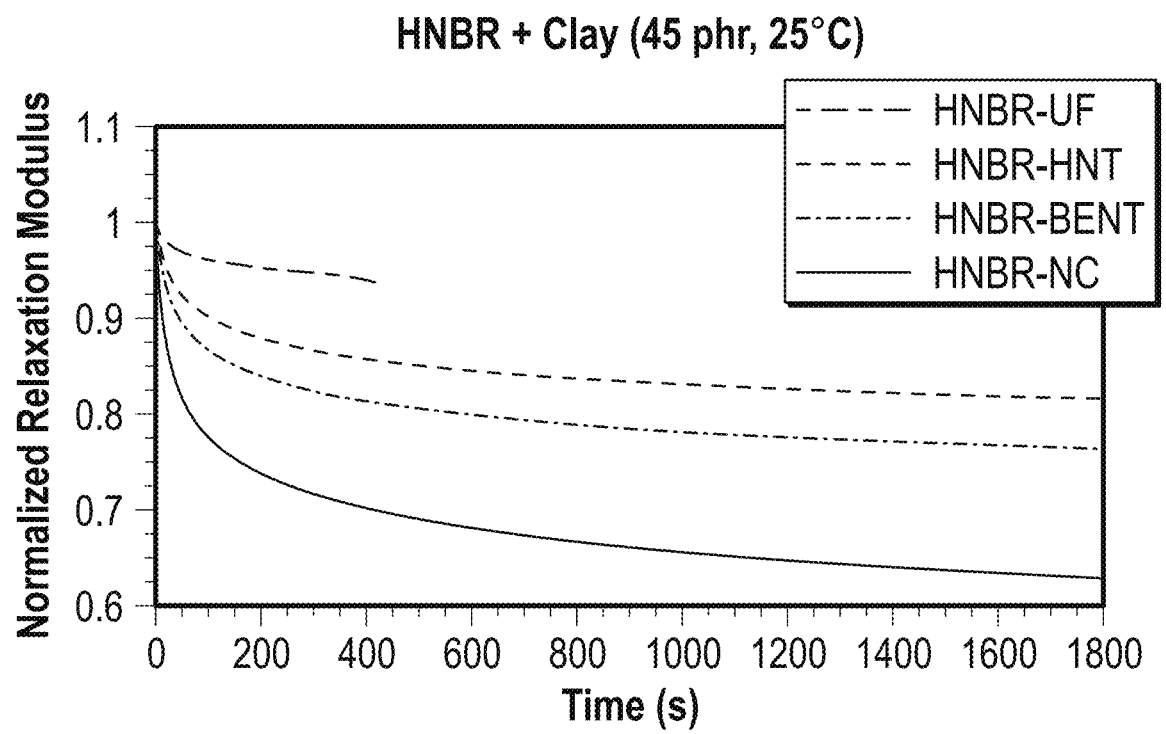
FIG. 19. Normalized relaxation modulus versus time profiles comparing elastomers, including an elastomer filled with halloysite nanotube (HNBR-HNT), an elastomer filled with bentonite (HNBR-BENT), an elastomer filled with surface-functionalized nanoclay (HNBR-NC), and an elastomer without these fillers (HNBR-UF).

HNBR-NC elastomers resulted in higher compliance (strain % at 1500 psi) and higher stress relaxation than conventional HNBR-CB. The HNBR-NG also exhibited higher stress relaxation than HNBR-CB. Mechanical testing was performed using the previously described stress relaxation profile at room temperature. The non-polar surface-functionalized clay, the polar hydrophilic bentonite, and halloysite nanotubes were all compared against a base unfilled HNBR sample. All samples contained 45 phr of clay filler as described in Table 1. FIG. 18 shows stress versus strain profiles of three different HNBR/clay composite elastomers compared with unfilled HNBR elastomer. FIG. 19 shows the normalized relaxation modulus versus time profiles comparing three different HNBR/clay composites and unfilled HNBR elastomer samples.

Among the elastomers containing clay filler particles at high temperatures (180° C.), only the HNBR-NC surface-functionalized elastomers were able to resist failure. Despite being in an inert nitrogen atmosphere, the HNBR-BENT elastomer containing bentonite filler particles shattered abruptly upon elevated loading of the sample, lending that the surface-functionalized clay particles in the HNBR-NC elastomers imparted high temperature fracture resistance to these samples. At this elevated temperature, the HNBR-HNT similarly failed during the loading process. Conversely, the HNBR-NC elastomer softened in the nitrogen atmosphere and resulted in strain exceeding the parameters allowed by the testing machine, i.e., it flattened to such a degree under the 1500 psi load that the platens of the compression testing machine reached their extension limit could compress the material no further.

EXAMPLE 13

X-Ray Diffraction Studies

Figure 20:
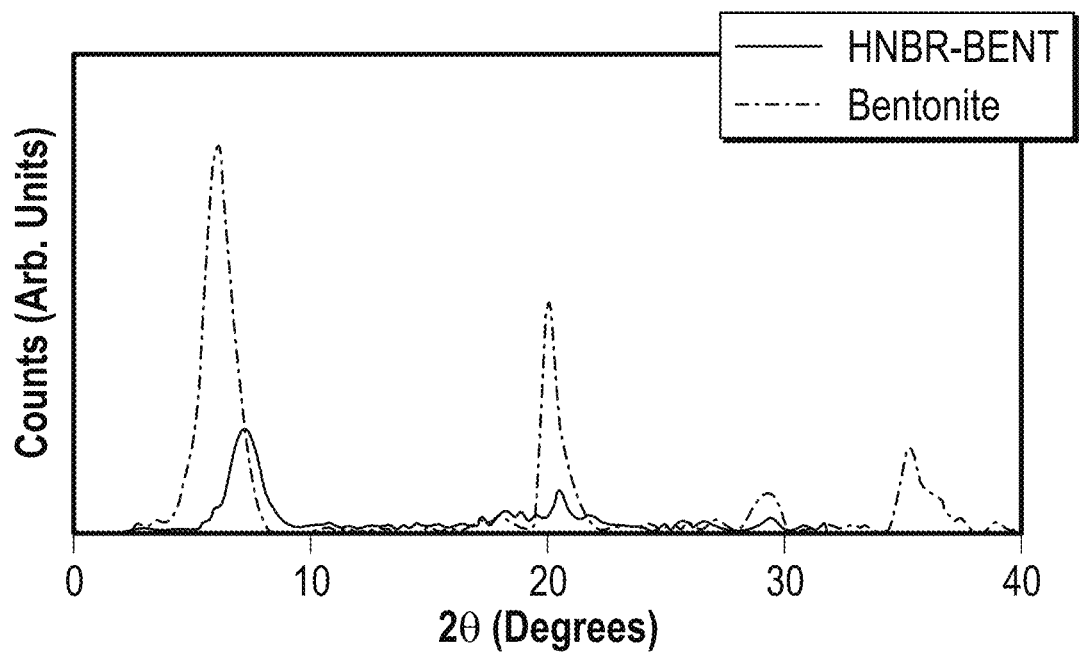
FIG. 20. XRD spectra of bentonite clay particles and an HNBR elastomer composite that incorporates these particles at 45 phr (HNBR-BENT).
Figure 21:
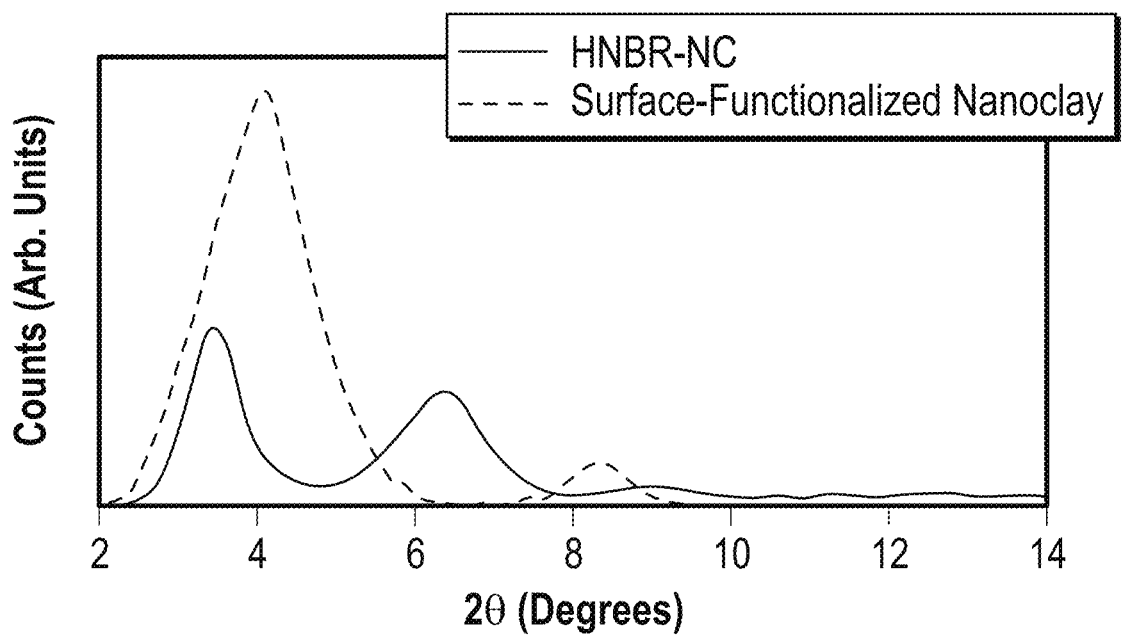
FIG. 21. XRD spectra of surface-functionalized nanoclay particles and an HNBR elastomer composite that incorporates these particles at 45 phr (HNBR-NC).

Samples comprised of HNBR and various types of clay were also compounded and tested via Instron and X-ray diffraction (XRD) instrumentation. XRD measurements were performed using a Bruker D8 instrument with an emission source of Cu-K$\alpha_1$ with a wavelength of 0.15418 nm. The XRD testing revealed the presence of intercalation in the surface-functionalized clay, and not in the bentonite, as shown in FIGS. 20 and 21. FIG. 20 illustrates the XRD spectra of bentonite clay particles and the HNBR elastomer composite incorporating these particles (HNBR-BENT-45 phr). Likewise, FIG. 21 shows the XRD spectra of surface-functionalized nanoclay particles and the HNBR elastomer composite incorporating these particles (HNBR-NC-45 phr). In the case of the surface-functionalized clay filler particles, the diffraction peaks shifted to small angles after incorporation in the elastomer. This behavior indicates an increase in the spacing in between layers of nanoclay from intercalation of the polymer chains. This intercalation is suspected to be facilitated by the surface-functionalization of the nanoclay particles to render them non-polar and more readily dispersible within the polymeric structure of the elastomer. Table 11 summarizes the peak values and d-spacing values for powdered clay and composite samples.

gas was pumped into the oven in order to prevent oxidation during heating and testing. The tests were programmed using Bluehill 3 software module from Instron. The displacement was measured by the crosshead movement, and the load cell was used to record the load requirements during the tests.

Figure 22:
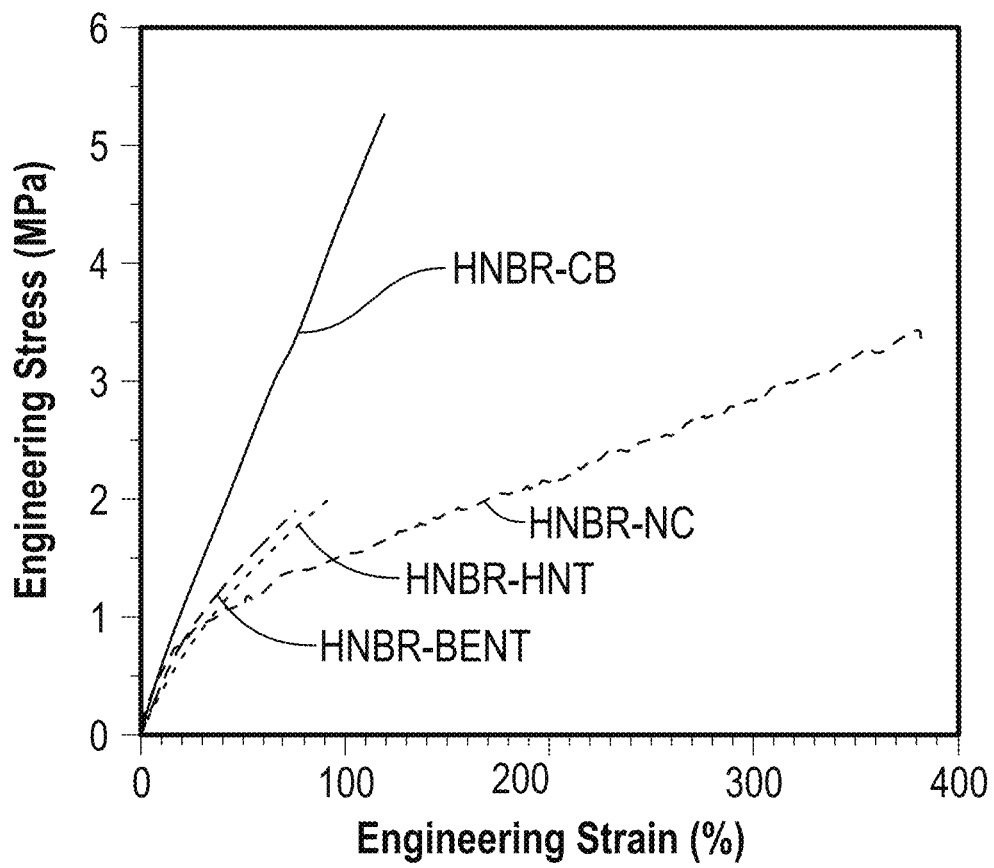
FIG. 22. Stress versus strain data, acquired at 120° C. and an extension rate of 50 mm/min, for HNBR elastomers filled with halloysite nanotube (HNBR-HNT), bentonite (HNBR-BENT), surface-functionalized nanoclay (HNBR-NC), and carbon black (HNBR-CB). All samples contained the same filler concentration (45 phr).
Figure 23:
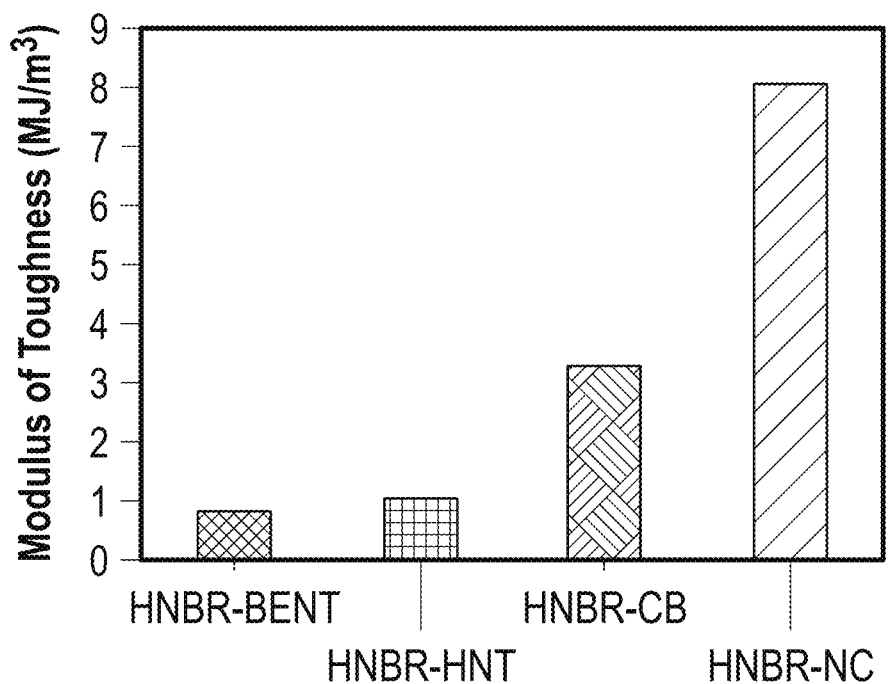
FIG. 23. Modulus of toughness at 120° C. for HNBR elastomers filled with halloysite nanotube (HNBR-HNT), bentonite (HNBR-BENT), surface-functionalized nanoclay (HNBR-NC), and carbon black (HNBR-CB). All samples contained the same filler concentration (45 phr).

FIG. 22 shows the stress versus strain results for HNBR elastomers filled with three different types of clay particles, namely, halloysite nanotubes (in HNBR-HNT), hydrophilic bentonite (in HNBR-BENT), and surface-functionalized nanoclay (in HNBR-NC), along with those for the conventional carbon black filled HNBR elastomer, HNBR-CB, for comparison. All composites contained 45 grams of filler per hundred grams of resin. See Table 1 and Table 2 for composition. The stress versus strain data are shown in FIG. 22. The elongation at break was about 380% for the elastomer filled with the surface-functionalized nanoclay, significantly higher than the elastomers filled with the other two types of clay particles (92% and 75% elongation for halloysite nanotubes and hydrophilic bentonite, respectively). The HNBR-CB elastomer failed at 120% elongation. The modulus of toughness (the area under the stress versus strain curve) is also significantly higher for the elastomer filled with the surface-functionalized clay particles (see FIG. 23).

TABLE 11

Observed Peak Values and d-spacings for various composite samples

| Sample | Peak 1 | | Peak 2 | | Peak 3 | |
|---|---|---|---|---|---|---|
| | 2θ (deg) | d (nm) | 2θ (deg) | d (nm) | 2θ (deg) | d (nm) |
| Bentonite clay particles | 6.10 | 1.45 | 20.05 | 0.443 | 29.30 | 0.305 |
| HNBR-BENT elastomer composite | 7.15 | 1.24 | 20.47 | 0.434 | 30.69 | 0.291 |
| Surface modified clay particles | 3.74 | 2.36 | 7.22 | 1.22 | n.d. | n.d. |
| HNBR-NC elastomer composite | 3.18 | 2.78 | 5.62 | 1.57 | 7.97 | 1.11 | n.d. = not detected

EXAMPLE 14

Higher Elongation at Break and Modulus of Toughness, at Elevated Temperature, of Elastomers Filled with Surface Functionalized Nanoclay Compared to Carbon Black and Other Clay Fillers Universal Testing Machine (Instron 5900R, Instron, Norwood, Mass.) equipped with a 30 kN load cell was used to characterize the stress softening behavior of the elastomer composites under tension mode. The elastomer samples were annealed at 100° C. for 12 h under vacuum to carry out residual curing before they were punched out. For measurements at temperatures above room temperature, an Applied Test Systems (ATS) heating oven (Butler, Pa.) was fitted to a load frame. Uniaxial tension tests were performed using a wedge grip, on flat dumbbell-shaped tensile specimens with dimensions of 33×6×2 mm³, punched out of vulcanized composite sheets using ASTM D412 Die-C. The samples were mounted onto a fixture after heating the oven to the measurement temperature and were allowed to equilibrate for 30 minutes before beginning measurements. Nitrogen

EXAMPLE 15

Figure 24:
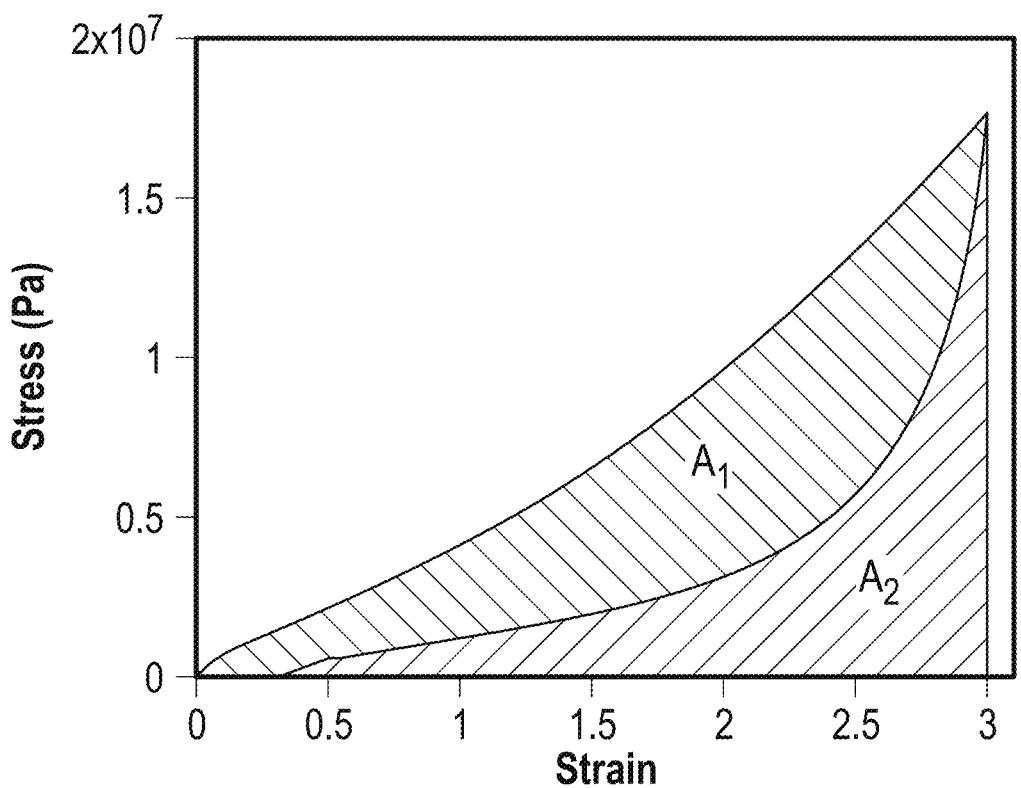
FIG. 24. Representative stress versus strain curves during loading and unloading are shown for the calculation of the dissipated energy fraction.

Cyclic Tensile Testing of Elastomers and Dissipated Energy Fraction: Higher Values for 2D Fillers Cyclic stress versus strain measurements were used to characterize hysteresis in the stress versus strain behavior of the elastomers. The area under the stress versus strain curve during loading corresponds to the work done per unit volume of the elastomer during stretching. The area under the stress versus strain curve during unloading corresponds to the energy recovered (per unit volume of the elastomer) when the elastomer returns to its original dimensions. The difference between these two values is the energy lost due to viscous dissipation. The dissipated energy fraction, calculated as the ratio of areas $A_1$ and $A_1+A_2$, depicted for a representative cyclic stress versus strain data set (single cycle) in FIG. 24, characterizes the viscous nature of the elastomer, the ability of the elastomer to flow and seal, and the ability of the elastomer to dissipate energy without undergoing brittle fracture. The areas $A_1$ and $A_2$, under the stress versus strain curves, are used in the calculation of the dissipated energy fraction during cyclic tensile testing.

Figure 25A:
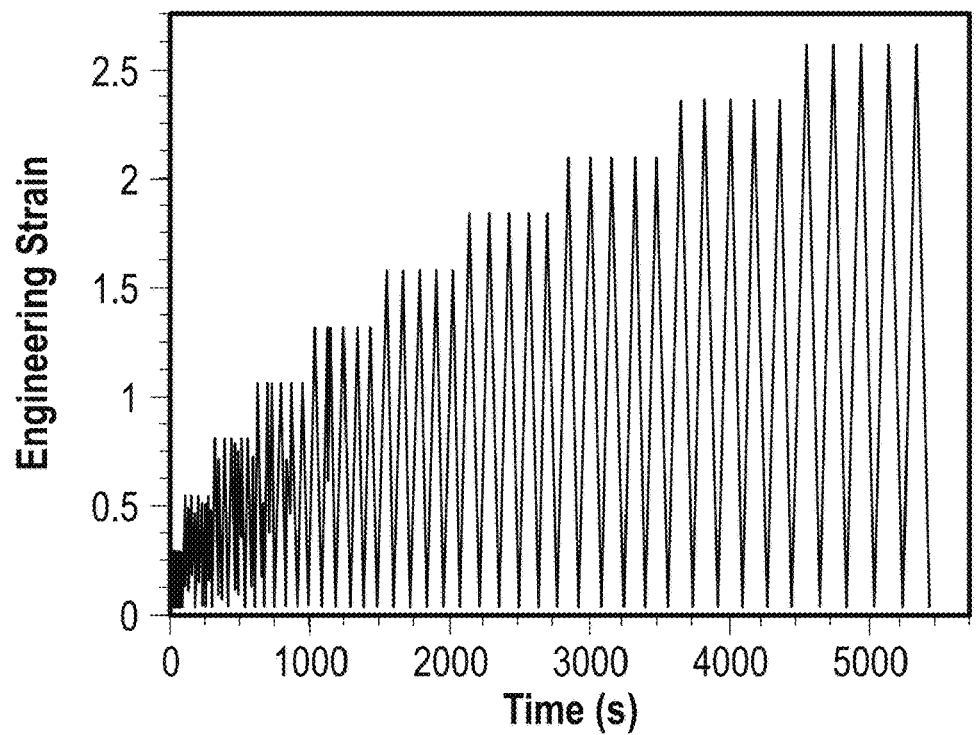
FIGS. 25A-D. Strain-controlled cyclic tests to characterize viscous energy dissipation in HNBR-NC-45 phr during extension at room temperature.
Figure 25B:
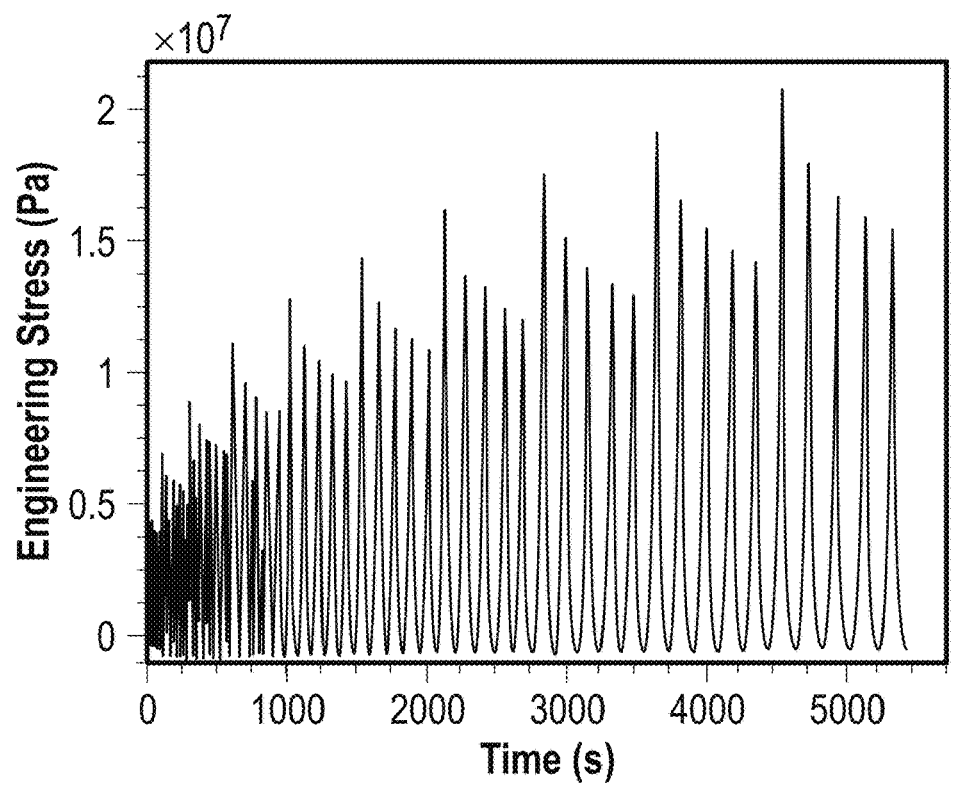
Figure 25C:
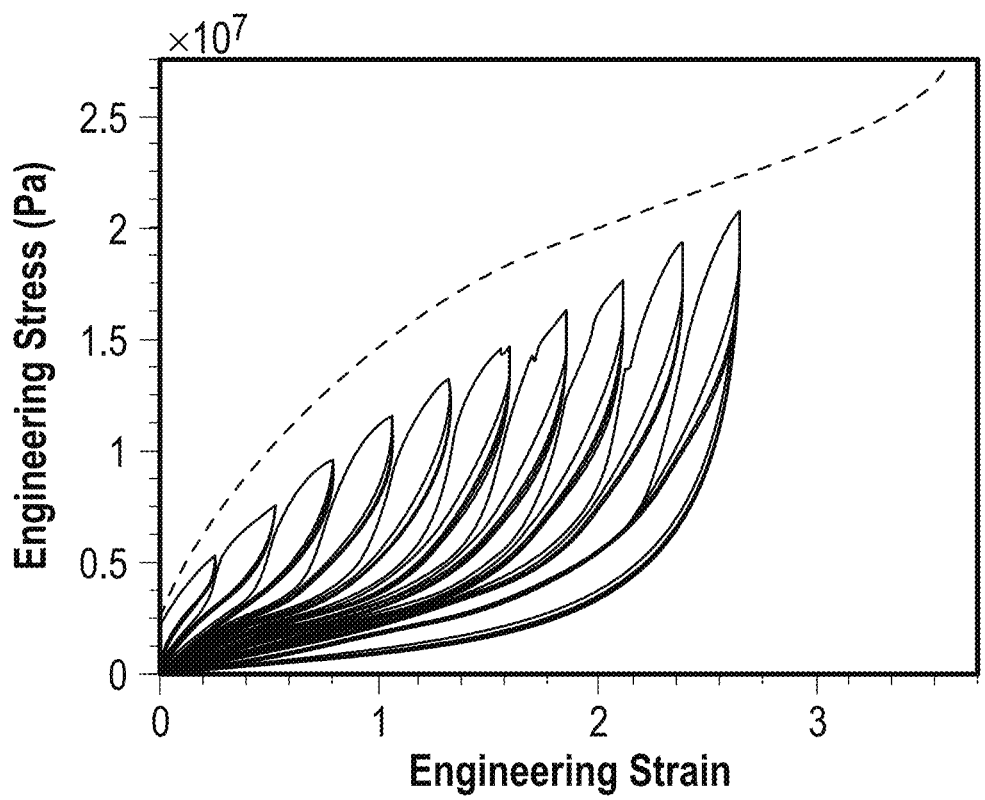
Figure 25D:
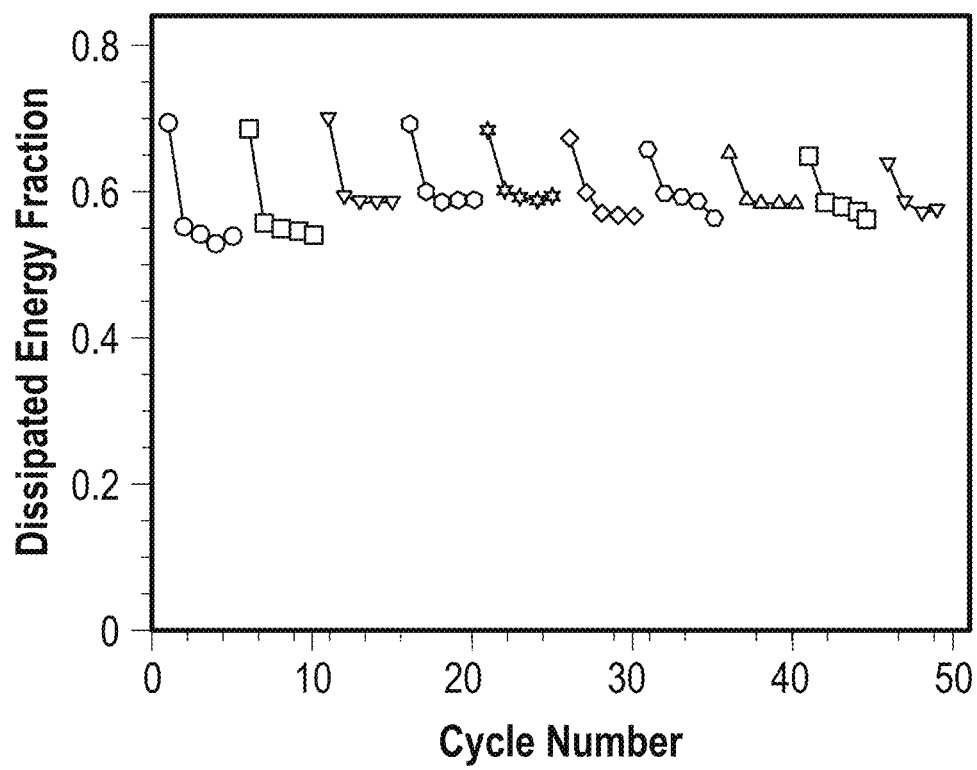
Figure 26A:
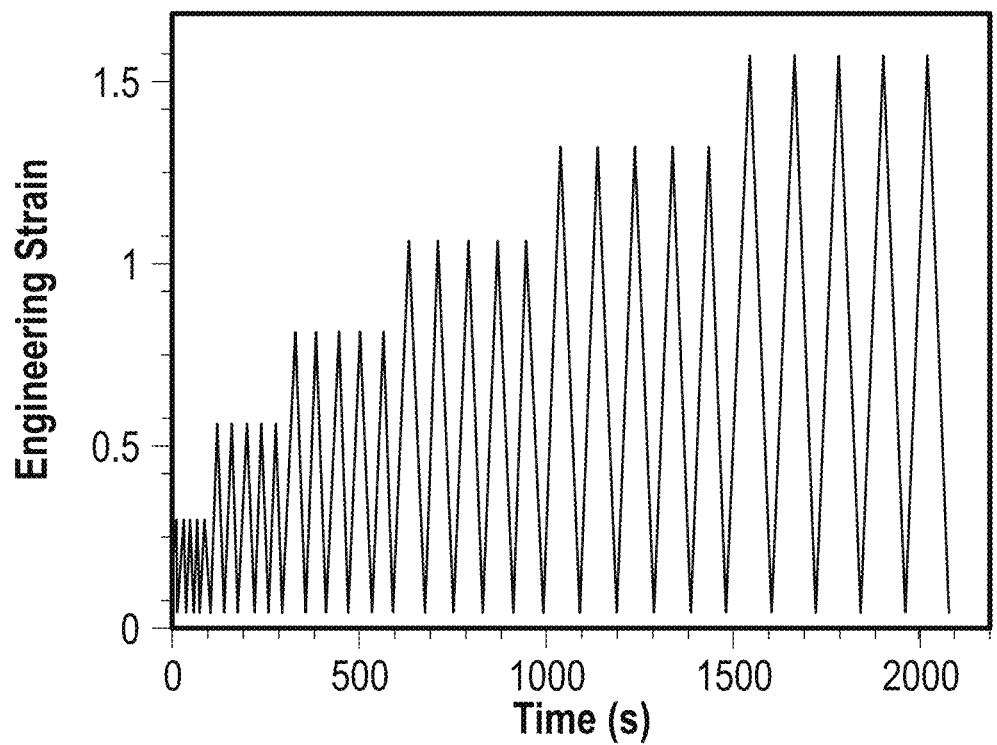
FIGS. 26A-D. Strain-controlled cyclic tests to characterize viscous energy dissipation in HNBR-NG-45 phr during extension at room temperature.
Figure 26B:
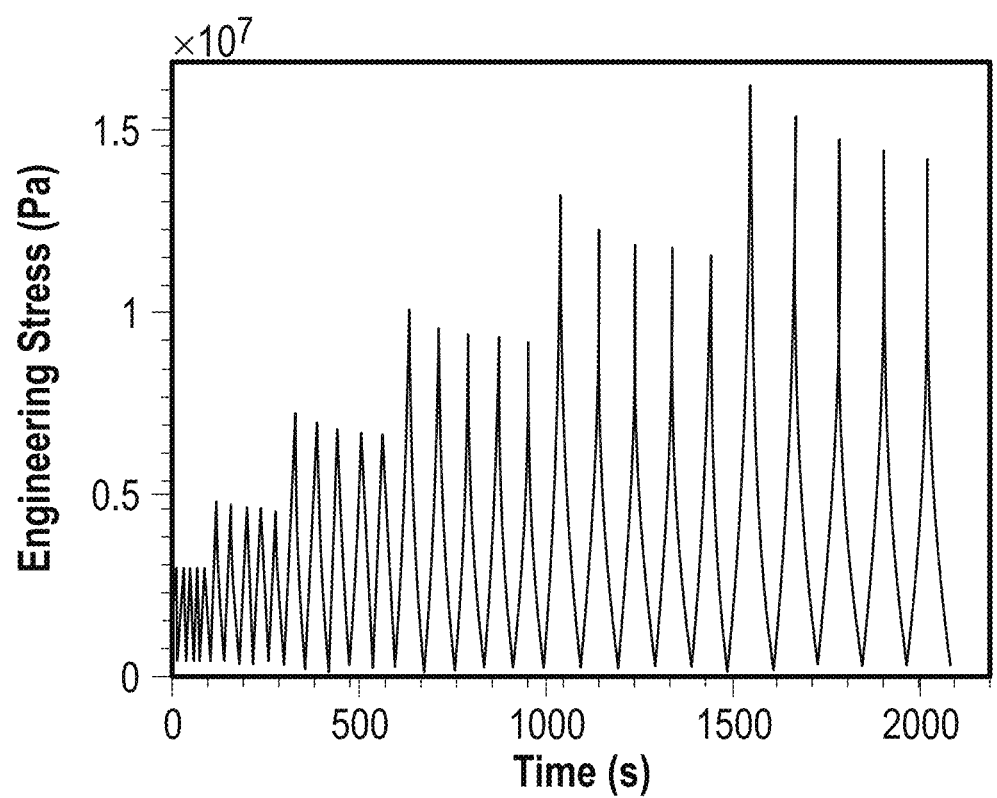
Figure 26C:
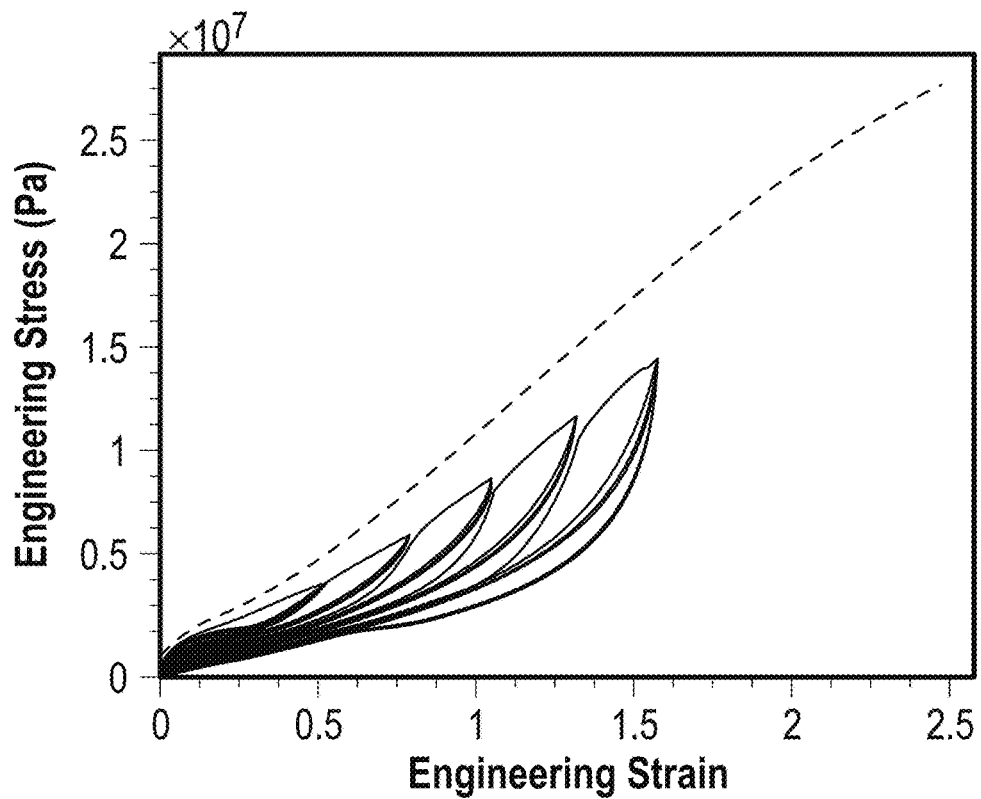
Figure 26D:
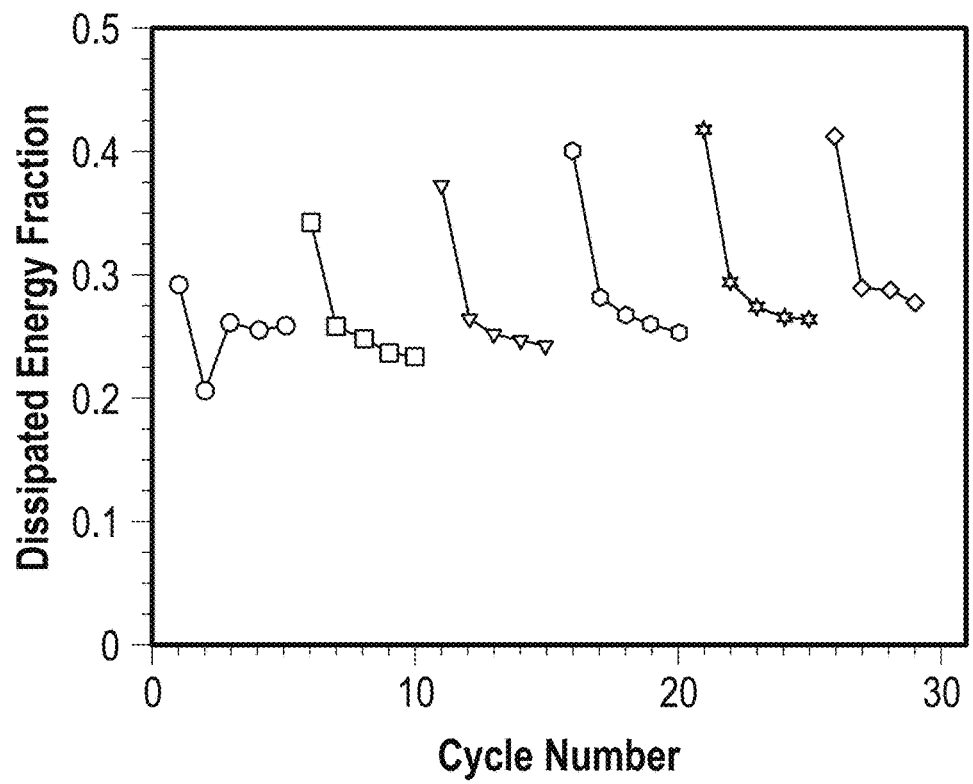
Figure 27A:
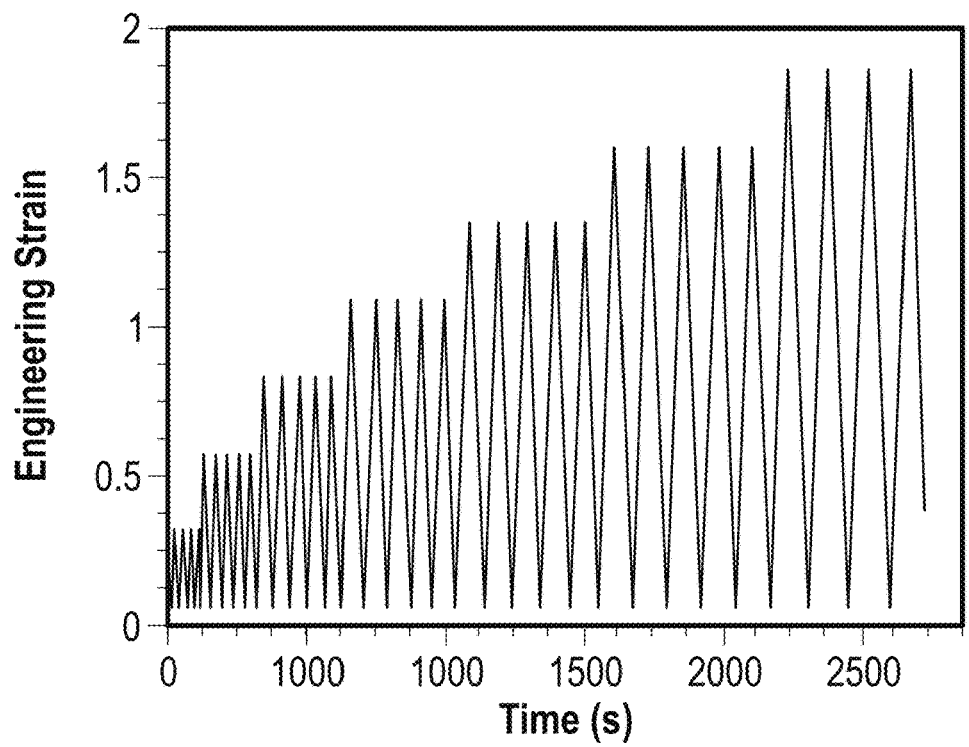
FIGS. 27A-D. Strain-controlled cyclic tests to characterize viscous energy dissipation in HNBR-CB-45 phr during extension at room temperature.
Figure 27B:
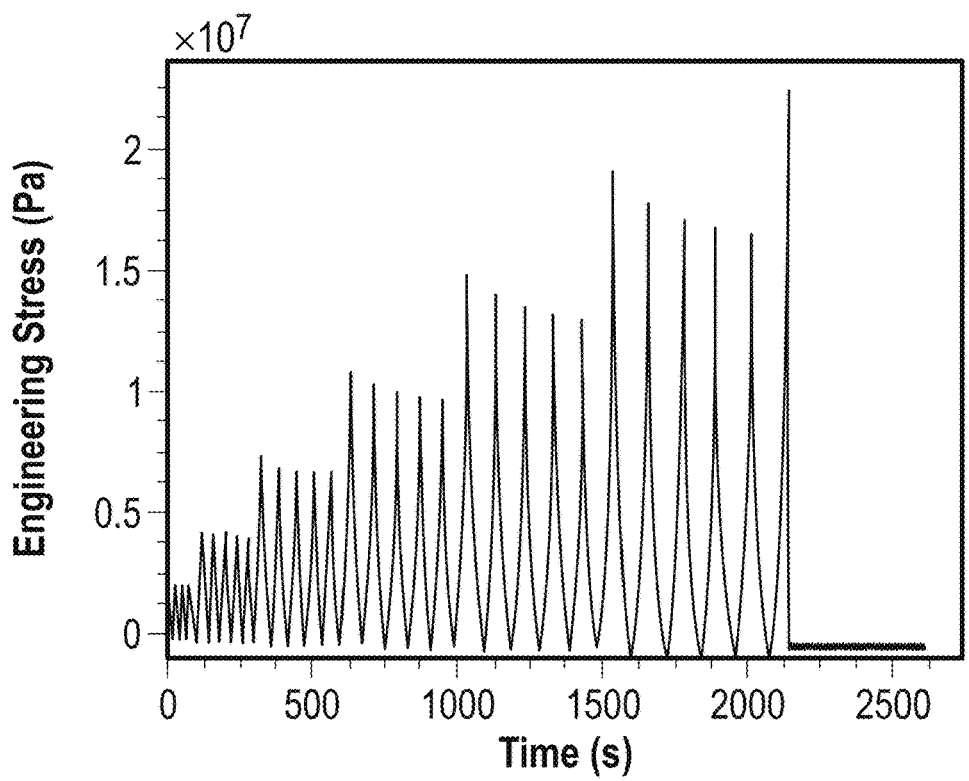
Figure 27C:
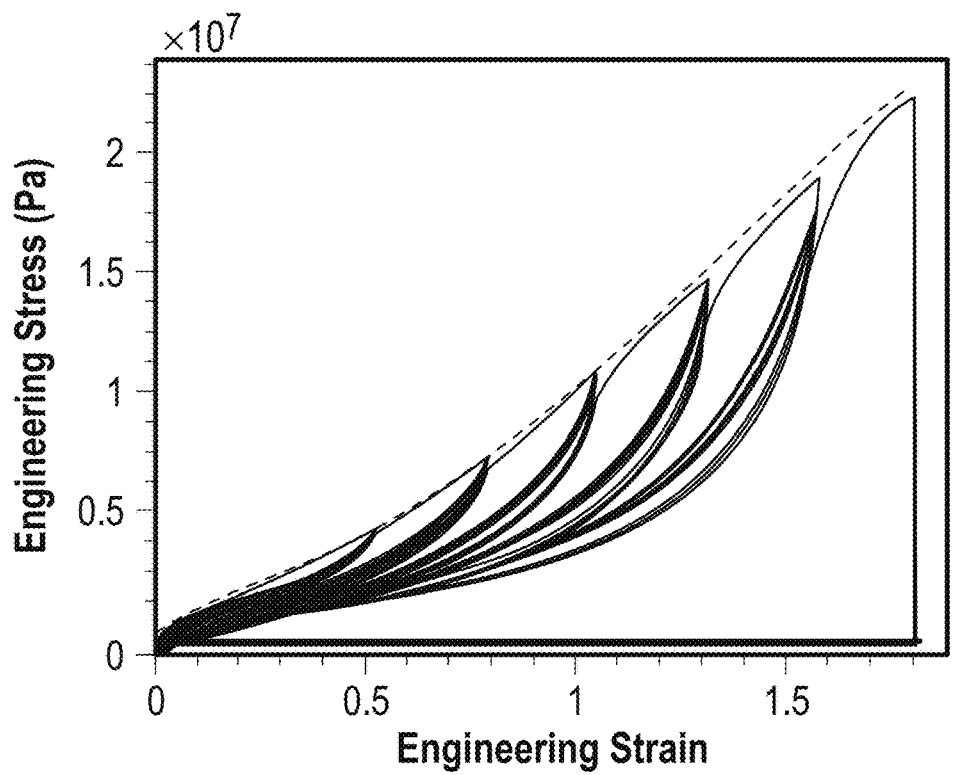
Figure 27D:
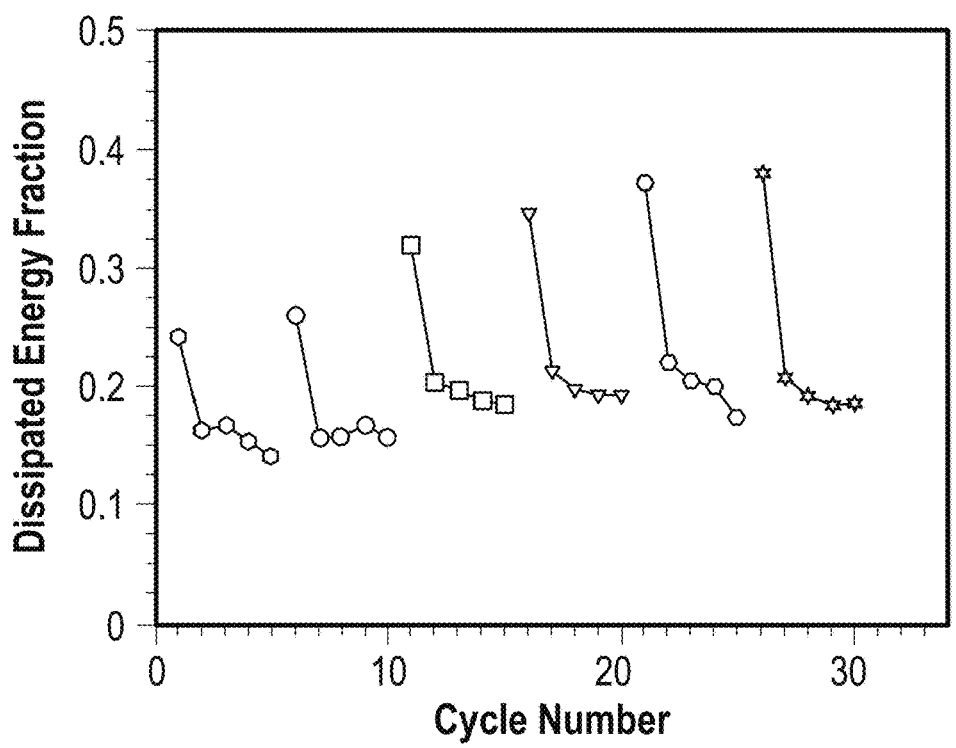

HNBR-NC dumbbell specimens, with 2 mm×2 mm cross-sections and 20 mm initial gage length, were subjected to cyclic tensile tests using a triangle wave strain profile shown in FIG. 25A. The measurements were conducted at different strain levels, in increments of 25% engineering strain, as shown in FIG. 25A. At each strain level, the specimen was subjected to 5 cycles of loading and unloading (at a rate of 50 mm/min). The stress values were recorded [see FIG. 25B] and the dissipated energy fraction was calculated for each loading-unloading cycle. The stress versus strain curves and the dissipated energy fraction values are shown in FIG. 25C and FIG. 25D. The dashed curve in FIG. 25C represents the stress versus strain data acquired using monotonic extension until fracture.

Similar results for the elastomers filled with nanographite (HNBR-NG) and carbon black (HNBR-CB) are shown in FIG. 26A-D and FIG. 27A-D, respectively.

Figure 28:
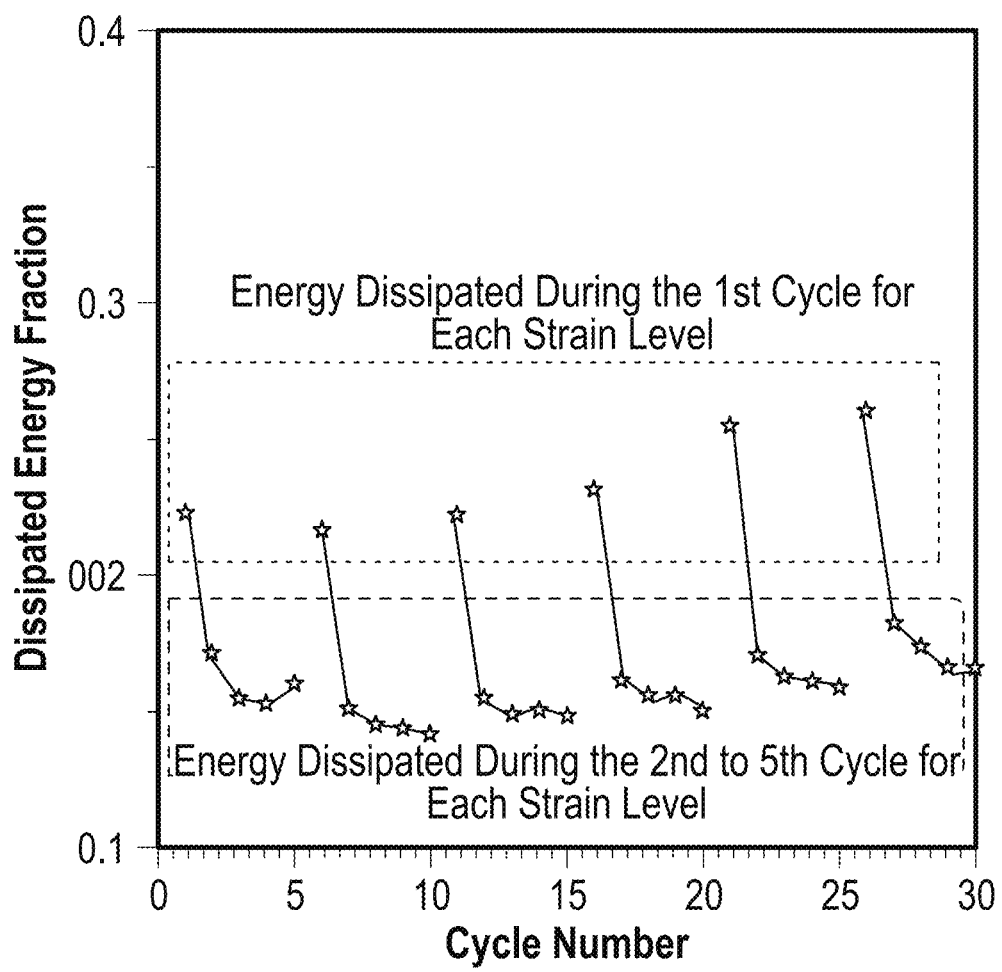
FIG. 28. Dissipated energy fractions for HNBR-CB-45 phr, showing higher energy dissipation during the first loading-unloading cycle of each strain level.

FIG. 28 shows the dissipated energy fraction for HNBR filled with carbon black. It is seen that the fractional energy dissipated is higher for the first cycle of each strain level, and decreases for the subsequent cycles in that strain level. For a given strain level, the dissipated energy fraction is maximum at the first cycle of that strain level.

EXAMPLE 16

Figure 29:
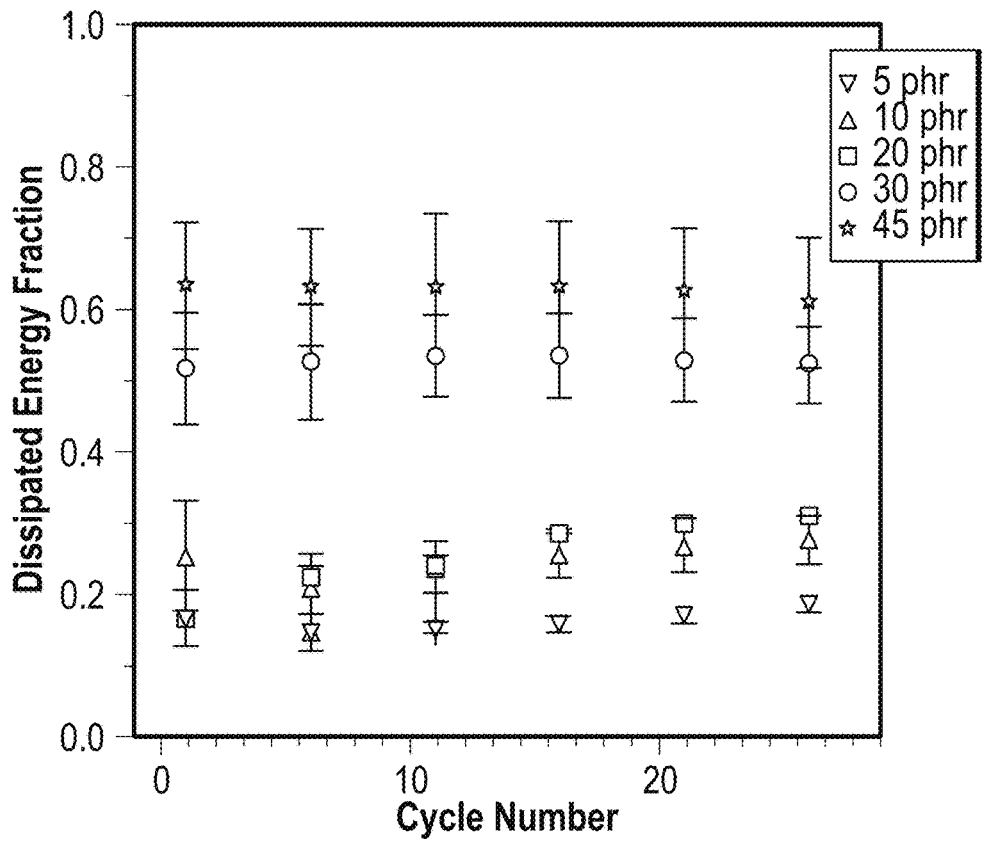
FIG. 29. Dissipated energy fractions at the first loading-unloading cycle of each strain level, for HNBR-NC composites filled with 5 phr, 10 phr, 20 phr, 30 phr, and 45 phr of the surface-funcationalized nanoclay as shown in Table 7.

Higher Energy Dissipation of Surface Functionalized Nanoclay and Nanographite Compared With Carbon Black, Carbon Fiber, and Other Clay Composite Samples FIG. 29 shows the first-cycle dissipated energy fractions for HNBR composites filled with surface functionalized clay. The compositions of the elastomers are given in Table 7. The dissipated energy fraction value at a strain level of 100% (cycle #16), for each clay content, is shown in Table 12.

TABLE 12

Dissipated energy fraction versus surface functionalized nanoclay concentration in cyclic tensile testing of the HNBR-NC elastomers at room temperature

| Sample name | Maximum dissipated energy fraction at 100% strain |
|---|---|
| HNBR-NC-5 phr | 0.16 ± 0.01 |
| HNBR-NC-10 phr | 0.25 ± 0.03 |
| HNBR-NC-20 phr | 0.28 ± 0.01 |
| HNBR-NC-30 phr | 0.53 ± 0.06 |
| HNBR-NC-45 phr | 0.63 ± 0.09 |

Figure 30:
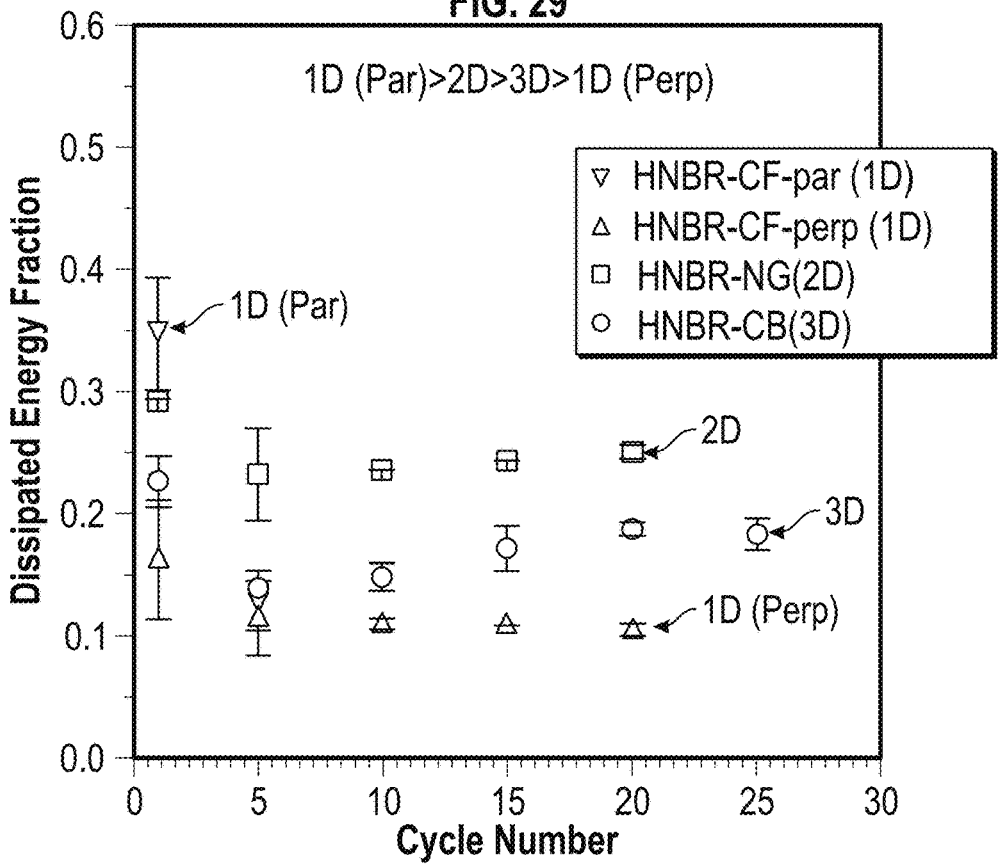
FIG. 30. Dissipated energy fraction at the first loading-unloading cycle of each strain levels for filled HNBR elastomers, including HNBR filled with nanographite (HNBR-NG), with carbon black (HNBR-CB), and with carbon fibers (HNBR-CF). HNBR-CF-par denotes measurements on carbon fiber-filled HNBR done parallel to the grain direction (see FIG. 6), and HNBR-CF-perp denotes measurements perpendicular to the grain direction.

FIG. 30 shows the first-cycle dissipated energy fractions for HNBR composites reinforced with carbon fillers, representative 1D, 2D, and 3D particles HNBR-CF, HNBR-NG, and HNBR-CB, respectively. The compositions of the elastomers are given in Table 2. The results are form cyclic tensile measurements conducted at room temperature. The dissipated energy fraction value at a strain level of 100% (cycle #26), for each clay content, is shown in Table 13. HNBR-CF-par denotes measurements on carbon-fiber-filled HNBR, done parallel to the grain direction (see FIG. 6), and HNBR-CF-perp denotes measurements perpendicular to the grain direction. All samples contained the same filler concentration (45 phr).

TABLE 13

Dissipated energy fraction at 100% strain for elastomers filled with carbon fibers (CF), nanographite (NG), and carbon black (CB) at room temperature

| Sample name | Maximum Dissipated energy fraction at 100% strain |
|---|---|
| HNBR-CF-par | Sample fracture before attaining 100% strain |
| HNBR-CF-perp | 0.11 ± 0.01 |
| HNBR-CB | 0.17 ± 0.02 |
| HNBR-NG | 0.24 ± 0.01 |

From the data reported in Table 12 and Table 13, it is clear that the dissipated energy fraction at 100% strain is higher for the two-dimensional fillers, namely surface functionalized clay and nanographite, compared with other fillers. The dissipated energy fraction for HNBR-NC-45 phr is 0.63±0.09, and for HNBR-NG-45 phr is 0.24±0.01. For conventional carbon black, the dissipated energy fraction is 0.17±0.02.

FIGS. 29 and 30 reflects improved extrudability of the HNBR-NG, HNBR-NC-30 phr and HNBR-NC-45 phr elastomers to dissipate a higher fraction of strain energy per cycle and thus withstand an extrusion process, without undergoing fracture, to a greater degree than the HNBR-CF-perp, HNBR-NG, and HNBR-CB samples. The HNBR-CF-par sample failed after a relatively low number of cycles.

The two-dimensional structure of the filler particles in the HNBR-NC and HNBR-NG elastomers contributes to the beneficial properties observed. These beneficial properties are true not only present in for highly filled elastomers of Table 1, containing 45 phr of particle filler, but also for lower filled elastomers such as those containing 30 phr shown in Table 7, as demonstrated above.

EXAMPLE 17

Scanning Electron Microscopy of Fractured Surfaces of Elastomers

Figure 31:
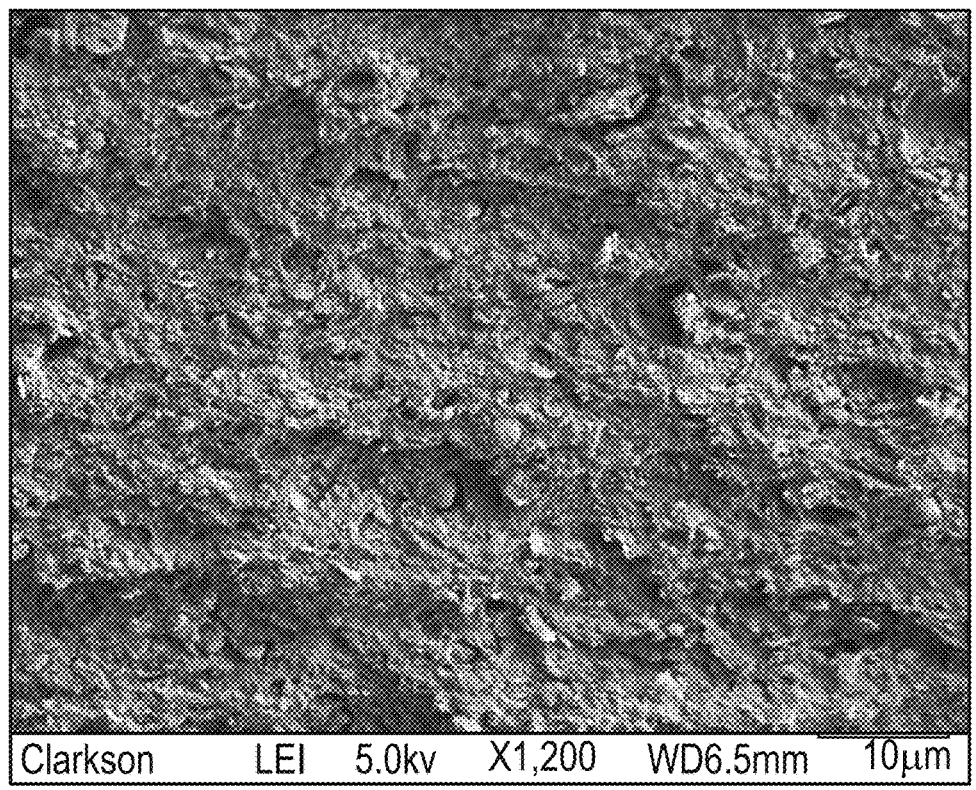
FIG. 31. Scanning electron microscopy image of a fractured cross-section of HNBR-NG-45 phr elastomer.
Figure 32:
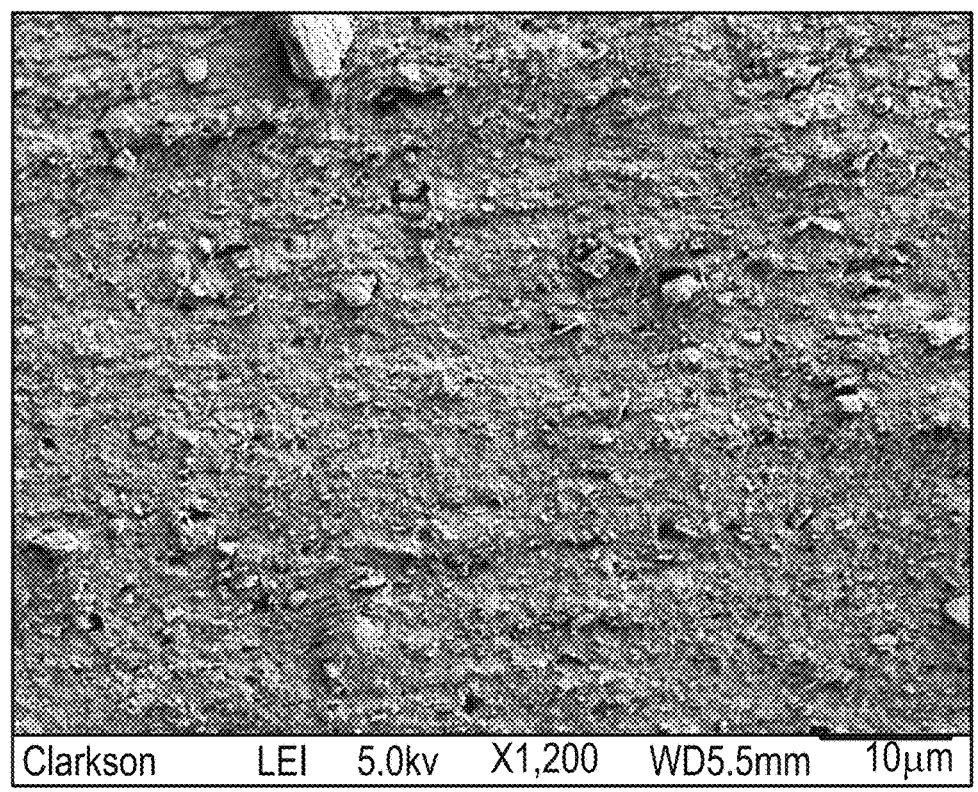
FIG. 32. Scanning electron microscopy image of a fractured cross-section of HNBR-NC-30 phr elastomer.
Figure 33:
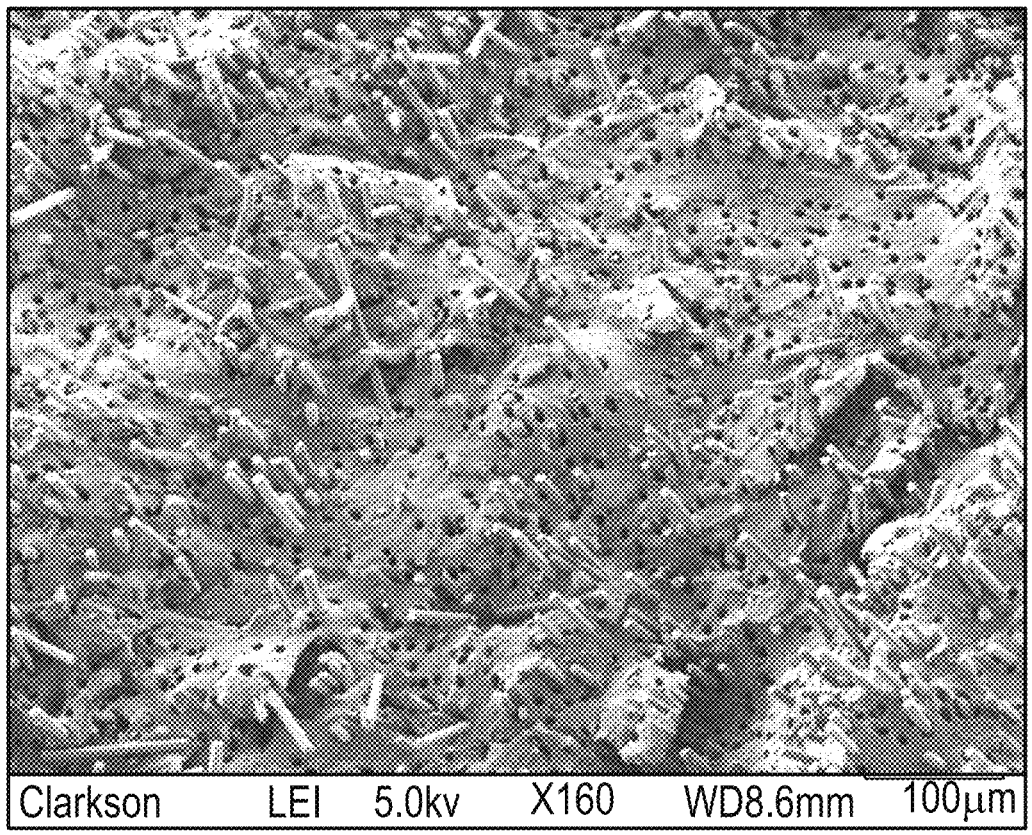
FIG. 33. Scanning electron microscopy image of a fractured cross-section of HNBR-CF-par elastomer.

SEM was used to analyze filler dispersion in the elastomers. Fractured surfaces of the elastomers were sputter-coated with thin Au/Pd layer and imaged using a JEOL JSM 6300 field-emission scanning electron microscope. The fracture surfaces were prepared by stretching SENT test specimens (see Example 11) at a rate of 5 mm/min. FIG. 31 shows an SEM image of a fractured cross-section of HNBR-NG-45 phr elastomer. FIG. 32 shows an SEM image of a fractured cross-section of HNBR-NC-30 phr elastomer. In these images, the nanographite and surface functionalized nanoclay fillers appear to be uniformly dispersed in the elastomer. The 2D fillers also show a preferential transverse orientation of their flat surfaces with respect to the fracture cross-section of the elastomer. Thus, the fillers have aligned themselves such that their flat surfaces are orientated along the stretch direction. FIG. 33 shows an SEM image of a fractured cross-section of the carbon fiber-filled HNBR-CF-45 phr elastomer that was stretched parallel to the grain direction seen in FIG. 6. Orientation of the fiber axis along the stretch direction is clearly seen. Adhesive failure at the filler-polymer interface is also evident. Noting the magnification scale, the individual filler carbon fiber particles within FIG. 33 are readily visible, compared to the less distinguishable nanographite and nanoclay particles in FIG. 31 and FIG. 32, respectively.

The incorporation of the two-dimensional fillers, nanographite and surface-functionalized nanoclay result in significant improvement in fracture strength of the elastomer composites. The thermal stability, characterized by the temperature corresponding to the maximum degradation rate and the activation energy of the degradation reaction, was also improved in the case of these fillers.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

We claim:

1. An elastomeric composition comprising:
   an elastomeric component comprising one or more elastomers; and
   a filler component comprising a plurality of two-dimensional particles, wherein the plurality of two-dimensional particles of the filler are dispersed in the elastomeric component, and wherein the filler component comprises particles that have been chemically treated to render their surfaces non-polar.

2. The elastomeric composition of claim 1, wherein the two-dimensional particles comprise graphite or a layered mineral silicate.

3. The elastomeric composition of claim 1, wherein the elastomeric component comprises a copolymer.

4. The elastomeric composition of claim 2, wherein the layered mineral silicate comprises montmorillonite particles that have been chemically treated to render surfaces of the montmorillonite particles non-polar.

5. The elastomeric composition of claim 1, wherein the elastomeric component comprises at least 20 wt % of at least one non-polar monomer.

6. The elastomeric composition of claim 1, wherein the two-dimensional filler particles are comprised of separable layers that have an average thickness in the range of 0.3-100 nm.

7. The elastomeric composition according to claim 1, further comprising at least one additive selected from the group consisting of an antidegradant, vulcanizing agent, activator, accelerator, retarder, inhibitors, processing aid, adhesion promoter, tackifier, antistatic agent, flame retardant, and colorant.

8. The elastomeric composition according to claim 1, wherein concentration of the filler component in the elastomeric composition is in the range of 1 to 70 parts per hundred by weight of the elastomeric component.

9. The elastomeric composition according to claim 1, wherein the elastomeric component comprises HNBR and the filler component comprises montmorillonite particles.

10. A method of forming an elastomeric composition, the method comprising:
    combining an elastomeric component comprising one or more elastomers with a filler component, wherein the filler component comprises a plurality of two-dimensional particles, such that the two-dimensional particles become dispersed in the elastomeric component, thereby forming the elastomeric composition, and wherein the filler component comprises particles that have been chemically treated to render their surfaces non-polar.

11. The method of forming an elastomeric composition of claim 10, wherein the two-dimensional filler particles are comprised of separable layers that have an average thickness in the range of 0.3-100 nm.

12. The method of forming an elastomeric composition of claim 10, further comprising combining at least one additive selected from the group consisting of an antidegradant, vulcanizing agent, activator, accelerator, retarder, inhibitors, processing aid, adhesion promoter, tackifier, antistatic agent, flame retardant, and colorant with the elastomeric component.

13. The method of forming an elastomeric composition of claim 10, wherein the elastomeric component comprises HNBR and the filler component comprises montmorillonite particles.

14. The method of forming an elastomeric composition of claim 10, wherein the elastomeric component comprises an accelerator and a vulcanizing agent prior to being combined with the filler component.

15. An elastomeric composition comprising:
    an elastomeric component comprising one or more elastomers; and
    a filler component comprising a plurality of two-dimensional particles;
    wherein the plurality of two-dimensional particles of the filler are dispersed in the elastomeric component;
    wherein the two-dimensional particles comprise graphite or a layered mineral silicate; and
    wherein the layered mineral silicate comprises particles that have been chemically treated to render surfaces of the particles non-polar.

* * * * *